United States Patent [19]
Amemiya et al.

[11] Patent Number: 5,465,348
[45] Date of Patent: Nov. 7, 1995

[54] TROUBLE DIAGNOSIS SYSTEM OF UPC CIRCUIT

[75] Inventors: Shigeo Amemiya; Takao Ogura; Takafumi Chujo; Hiroshi Takeo; Michio Kusayanagi, all of Kawasaki; Naoaki Yamanaka, Tokyo; Yoichi Sato, Yokohama; Akihiko Takase, Tokyo; Shigeo Shinada, Yokohama; Mituhiro Takano, Yokohama; Kiyoshi Saitou, Yokohama; Kazuhiko Hohara, Fujisawa; Tetuhiro Okabe, Yokohama, all of Japan

[73] Assignee: Fujitsu Limited, Kanagawa, Japan

[21] Appl. No.: 2,772

[22] Filed: Jan. 8, 1993

[30] Foreign Application Priority Data

Jan. 10, 1992 [JP] Japan .................................. 4-003022

[51] Int. Cl.$^6$ .................................................. G06F 11/00
[52] U.S. Cl. ................................ 395/182.02; 395/184.01
[58] Field of Search ............................. 371/8.1, 48, 15.1, 371/67.1, 68.1, 68.2, 68.3, 395, 425, 575, 725; 370/13, 17, 20.1, 62; 364/381.0

[56] References Cited

U.S. PATENT DOCUMENTS

| | | | |
|---|---|---|---|
| 5,130,984 | 7/1992 | Cisneros | 370/94.1 |
| 5,157,654 | 10/1992 | Cisneros | 370/60 |
| 5,285,442 | 2/1994 | Iwamura et al. | 370/17 |
| 5,299,209 | 3/1994 | Murayama et al. | 370/60.1 |
| 5,325,358 | 6/1994 | Goeldner | 370/60 |

Primary Examiner—Robert W. Beausoliel, Jr.
Assistant Examiner—Norman M. Wright

[57] ABSTRACT

A UPC circuit fault diagnosis system for diagnosing a failure in a UPC circuit controls cell traffic volume on the basis of prescribed information about cell traffic. Failure diagnosis of a UPC circuit is provided by a usage parameter determination of at least one kind of cell, using more than one system and comparing determination results. The diagnosis system has an operating UPC circuit for controlling a total of m kinds of cells, and a standby UPC circuit for controlling a total of n kinds of cells. The system also has a total of q bridge memories for keeping a chronological record of the prescribed information of arriving cells. A fault diagnosis of the bridge memories is provided by comparing the contents of the bridge memories, using more than one system.

30 Claims, 19 Drawing Sheets

FIG. 7

| S-UPC CIRCUIT | SETTING | | POLISHING DETERMINATION RESULT | | | | | | | | | | | | | | | | | | | | |
|---|---|---|---|---|---|---|---|---|---|---|---|---|---|---|---|---|---|---|---|---|---|---|---|
| | S | VPI PARAMETER | $C_1$ | | $C_2$ | | $C_3$ | | $C_4$ | | $C_5$ | | $C_6$ | | $C_7$ | | $C_8$ | | $C_9$ | | $C_{10}$ | | $C_{11}$ | |
| $5A_{W1}$ | 1 | 1 | 0 | 0 | 1 | 0 | 0 | 0 | 1 | 0 | 0 | 0 | 0 | 0 | 0 | 0 | 0 | 0 | 0 | 0 | 0 | 0 | 0 | 0 |
| $5A_{W2}$ | 1 | 2 | 0 | 0 | 0 | 0 | 0 | 0 | 0 | 0 | 1 | 0 | 0 | 0 | 1 | 0 | 0 | 0 | 1 | 0 | 0 | 0 | 1 | 0 |
| $5A_{W3}$ | — | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| $5A_{P1}$ | 0 | 1 | 0 | 0 | 0 | 0 | 0 | 1 | 0 | 1 | 0 | 0 | 0 | 0 | 0 | 1 | 0 | 0 | 0 | 0 | 0 | 0 | 0 | 0 |
| $5A_{P2}$ | 0 | 2 | 0 | 0 | 0 | 0 | 0 | 0 | 0 | 0 | 0 | 0 | 0 | 1 | 0 | 1 | 0 | 0 | 0 | 0 | 0 | 1 | 0 | 1 |
| $5A_{P3}$ | 0 | 2 | 0 | 0 | 0 | 0 | 0 | 0 | 0 | 0 | 0 | 0 | 0 | 0 | 0 | 0 | 0 | 1 | 0 | 1 | 0 | 1 | 0 | 1 |

FIG. 10

| S-UPC CIRCUIT | SETTING | | TRAFFIC MEASUREMENT RESULT | | | | | | | | | | |
|---|---|---|---|---|---|---|---|---|---|---|---|---|
| | S | VPI PARAMETER | $C_1$ | $C_2$ | $C_3$ | $C_4$ | $C_5$ | $C_6$ | $C_7$ | $C_8$ | $C_9$ | $C_{10}$ | $C_{11}$ |
| 5 $BW_1$ | 1 | 1 | 0 | ×3 | 2 | 2 | 0 | 0 | 0 | 0 | 0 | 0 | 0 |
| 5 $BW_2$ | 1 | 2 | 0 | 0 | 0 | 0 | ×3 | 2 | 3 | 2 | 3 | ×2 | 3 |
| 5 $BW_3$ | 0 | 1 | 0 | 2 | 2 | 2 | 0 | 0 | 0 | 0 | 0 | 0 | 0 |
| 5 $BP_1$ | 0 | 1 | 0 | 2 | ×3 | 2 | 0 | 0 | 0 | 0 | 0 | 0 | 0 |
| 5 $BP_2$ | 0 | 2 | 0 | 0 | 0 | 0 | 2 | ×3 | 3 | 2 | ×2 | 3 | 3 |
| 5 $BP_3$ | 0 | 2 | 0 | 0 | 0 | 0 | 2 | 2 | ×2 | ×3 | 3 | 3 | 3 |

TROUBLE DIAGNOSIS SYSTEM OF UPC CIRCUIT

BACKGROUND OF THE INVENTION

The present invention relates to a fault diagnosis apparatus for a UPC circuit, and more particularly to a fault diagnosis method of a UPC circuit controlling a flow rate of a stream flow of cells on the basis of prescribed information relative to cell traffic.

A so-called ATM (asynchronous transfer mode) technology is now being developed for performing asynchronous transfer of a cell, which is a kind of fixed length packet. In the ATM network, a subscriber makes a declaration about his cell traffic to a central terminal, and the central terminal effects control of a flow rate of the stream flow of cells on the basis of the declaration. This control is called usage parameter control or UPC and is an indispensable technology for successfully operating the ATM network.

FIGS.1 and 2 show various methods of the usage parameter control mentioned above. FIG.1(A) shows a time interval method, in which time intervals $t_1$, $t_2$ between arrivals of cells are measured and a determination is made as to whether or not a traffic excess exists by comparing the measurement results with a prescribed time T. FIG.1(B) shows a T-X method, in which numbers $x_1$, $x_2$ of cells arriving during a prescribed period T are counted, and a determination is made as to whether or not a traffic excess exists by comparing the counts with a prescribed cell count X. FIG.1(C) shows a DB (dangerous bridge) method, in which numbers $x_1$–$x_6$ of cells arriving during each of prescribed time intervals T and having their phases shifted by $\Delta t$ with respect to each other are counted, $\Delta t$ being a time period required for one cell to pass, and a determination is made as to whether or not traffic excess exists by comparing the counts with a prescribed cell count X.

FIG.2(A) shows a CAT-M method. In the case illustrated in FIG.2(A), time intervals $t_1$–$t_5$, having their phases shifted with respect to each other upon each arrival of a cell are measured until the number of arriving cells is equal to the number obtained by adding 1 to a prescribed cell count X, and a determination is made as to whether or not a traffic excess exists by comparing the measurement results with a prescribed time T. FIG.2(B) shows a LB method. In the case illustrated in FIG.2(B), a count is incremented by one upon each arrival of a cell while, at the same time, the count is continuously decremented by a prescribed rate, and a determination is made as to whether or not a traffic excess exists by comparing the count value of a counter and a prescribed count B.

FIG.3 illustrates the configuration of a conventional usage parameter control method and, more specifically, shows an example where the DB method of FIG.1(C) is employed. The DB method, allows control to be applied to an ATM cell, which control resembles the control of the number of people who can walk across a "dangerous bridge" at the same time. In this method, the number of cells that can coexist at a given moment on a bridge is designated as X, the parallel of which bridge is realized by a cell time having a duration of T.

The UPC circuit shown in FIG.3 comprises a cell information branching part 1 (SB) for causing the input cell information to branch; a cell delay part 2 (SM) for delaying the input cell; a cell control part 3 (SC) for effecting control by which a cell passes through control part 3 unmodified, or is abandoned, or has a marking applied thereto; a bridge memory 4 (BM) for recording information relative to a cell; operating S-UPC circuits $20_{w1}$–$20_{wm}$ 1 each being equipped with one traffic measuring part; an OR gate circuit (13) for giving a determination that an input cell be abandoned on the basis of the comparison result, outputted by a comparator 56 provided in each of the operating S-UPC circuits $20_{w1}$–$20_{wm}$, and for feeding the determination result to the input of the cell control part 3.

A parameter memory (PM) 50 of the S-UPC circuit $20_{w1}$ stores: a VPI parameter (virtual path identifier) of an object cell, a declared time interval (an order value of a time interval) T and a declared cell count (an order value of cell count) X. When a cell on a highway arrives at a point of time, the cell information branching part 1 causes a predetermined header information (for example, VPI: virtual path identifier) to branch the cell off to the cell delay part 2 and to the S-UPC circuits $20_{w1}$–$20_{wm}$. The cell delay part 2 delays the cell by a time period necessary for determination of the existence of the traffic excess as described above. An object cell filter (SF) 52 makes a discrimination as to whether or not the VPI information that has branched agrees with the VPI parameter of its own, and, if there is an agreement, outputs a discrimination pulse V. Upon the output of the discrimination pulse V, the count of a counter (CTR) 55 is incremented. The bridge memory 4 stores a chronological record of the past VPI information going back a maximum cell time length of $T_{MAX}$. On the basis of the order value T, a selector (SEL) 54 reads out, from the bridge memory 4, the VPI information going back the cell time length of T. An object cell filter (SF) 53 makes a discrimination as to whether or not the read VPI information agrees with the VPI parameter of its own, and, if there is an agreement, outputs a discrimination pulse V'. Upon receiving the output of the discrimination pulse V', the count of the counter 55 is decremented.

Thus, the counter 55 continuously counts the number x of cells arriving during prescribed time periods T having their phases shifted by the one-cell pass time $\Delta t$ with respect to each other. A signal x indicating the cell count and output by the counter 55 is fed, when prompted by the discrimination pulse V, to the input of the comparator (CMP) 56. The comparator 56, upon comparing the cell count x with the order value X, outputs a control signal $D_{w1}$ to the cell delay part 2 in case x>X holds, thereby causing the cell inputted to the cell delay part 2 to have a marking applied thereto or be abandoned. If x>X does not hold, the comparator 56 does not output the control signal $D_{w1}$. Accordingly, the cell inputted to the cell delay part 2 is allowed to pass unmodified through the control part 3. The same description holds true of the other S-UPC circuits $20_{w2}$–$20_{wm}$.

As has described above, the conventional art allows a total of m UPC circuits to effect a total of m kinds of usage parameter. It results from this that the conventional art has a disadvantage in that it is not capable of detecting a failure in the traffic measuring part of, for example, the counter circuit, thereby causing the UPC circuits to proceed with false usage parameter control.

The same problem arises not only in the DB method but also in the time interval method, the T-X method, the CAT-M method, and the LB method.

Moreover, the UPC circuit employing the conventional DB method and effecting control using a single bridge memory has a disadvantage in that it is not capable of detecting a failure in the bridge memory, thereby possibly causing the UPC circuits to proceed with false usage parameter control.

SUMMARY OF THE INVENTION

Accordingly, an object of the present invention is to provide a novel and useful UPC fault diagnosis apparatus in which the above disadvantages of the conventional art are eliminated.

A more specific object of the present invention is to provide a UPC fault diagnosis apparatus capable of accurately diagnosing a failure in a UPC circuit.

These objects can be achieved by providing a fault diagnosis, using a UPC circuit fault diagnosis apparatus for controlling cell traffic on the basis of prescribed information relative to the cell traffic, the apparatus comprising:

an operating UPC circuit (W) for effecting polishing control of a total of m kinds of cells; and a spare UPC circuit (P) for effecting usage parameter control of a total of n kinds of cells;

wherein a determination of cell traffic of at least one kind of cell is made, using more than one system, and in that the polishing determination results are compared.

Further, the above objects can be achieved by giving fault diagnosis of a UPC circuit, using a UPC circuit fault diagnosis apparatus for controlling cell traffic on the basis of prescribed information relative to the cell traffic, the apparatus comprising:

an operating UPC circuit (W) for effecting usage parameter control of a total of m kinds of cells;

a spare UPC circuit (P) for effecting traffic measurement of a total of n kinds of cells;

wherein traffic measurement of at least one kind of cell is made, using more than one system, and wherein the traffic measurement results are compared.

Further, the above objects can be achieved by a UPC circuit fault diagnosis apparatus for controlling cell traffic on the basis of prescribed information relative to cell traffic, said method comprising:

providing an operating UPC circuit (W) for effecting usage parameter control of a total of m kinds of cells;

providing a spare UPC circuit (P) for effecting traffic measurement of a total of n kinds of cells; and providing a total of q bridge memories ($4_1$–$4_q$) for keeping a chronological record of prescribed information on arriving cells, and wherein the contents of the bridge memories $4_1$–$4_q$ are compared, using more than one system, and a fault diagnosis of the bridge memories $4_1$–$4_q$ is given.

BRIEF DESCRIPTION OF THE DRAWINGS

FIG.7 shows examples of diagnoses given in accordance with determination results;

FIG. 10 shows examples of diagnoses given in accordance with traffic measurement results;

DESCRIPTION OF THE PREFERRED EMBODIMENTS

A detailed description will be given below of the embodiments of the present invention, with reference to the attached drawings. Throughout the specification, like numerals denote like components.

Figure 4:
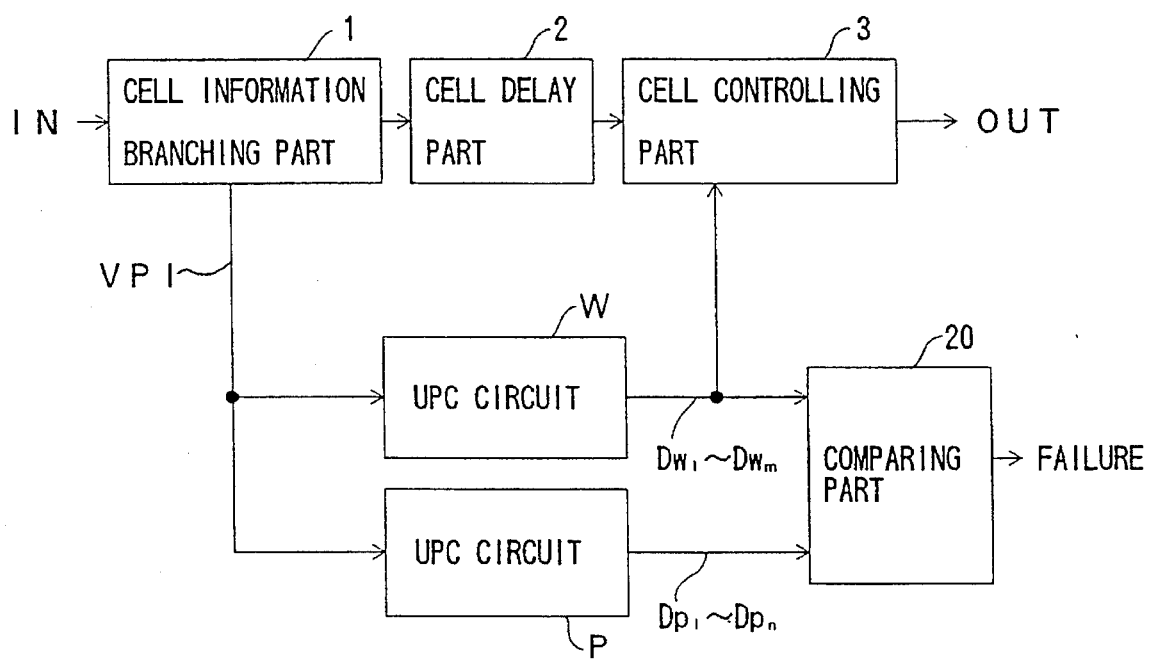
FIG.4 illustrates a structural outline of a fault diagnosis system according to a first embodiment of the present invention.

The system shown in FIG.4 comprises a cell information branching part 1 for causing the header information of the input cell to branch off; a cell delay part 2 for delaying the input cell for a period of time necessary for effecting determination of whether a cell is to be passed or abandoned; a cell control part 3 for effecting, in accordance with the determination results delivered from an operating UPC circuit W and a spare UCP circuit P provided for effecting said determination, control by which a cell is either made to pass unmodified, or abandoned, or has a marking applied thereto; and a comparing part 20 for comparing the determination results delivered from the operating and spare UCP circuits W and P, respectively, and for finding out whether or not there is any failure.

Referring to FIG.4, a cell has its header information branched off upon arriving at the cell information branching part 1, and one branch of VPI information is fed to the input of the cell delay part 2. The other branch of VPI information is fed to the operating and spare UPC circuits W and P, respectively. The operating UPC circuit W is configured such that it is able to effect control of a total of m kinds of cells; and the spare UPC circuit P is configured such that it is able to effect determination of a total of at least n kinds of cells.

Accordingly, the UPC circuits W and P carry out usage parameter determination of at least one kind of cell, using more than one system. The comparing part 20 gives a fault diagnosis of the UPC circuits by comparing determination results $D_{w1}-D_{wn}$ delivered from an operating system with determination results $D_{p1}-C_{pn}$ delivered from at least one spare system. The cell control part 3, upon receiving the signals $D_{w1}-D_{wn}$ indicating the determination results from the operating UPC circuit W, applies a marking to or abandons the cell held at the cell delay part 2 when the signals $D_{w1}-D_{wn}$ are in a "true" state, and allows the cell to pass unmodified when the signals $D_{w1}-D_{wn}$ are in a "false" state.

Figure 5:
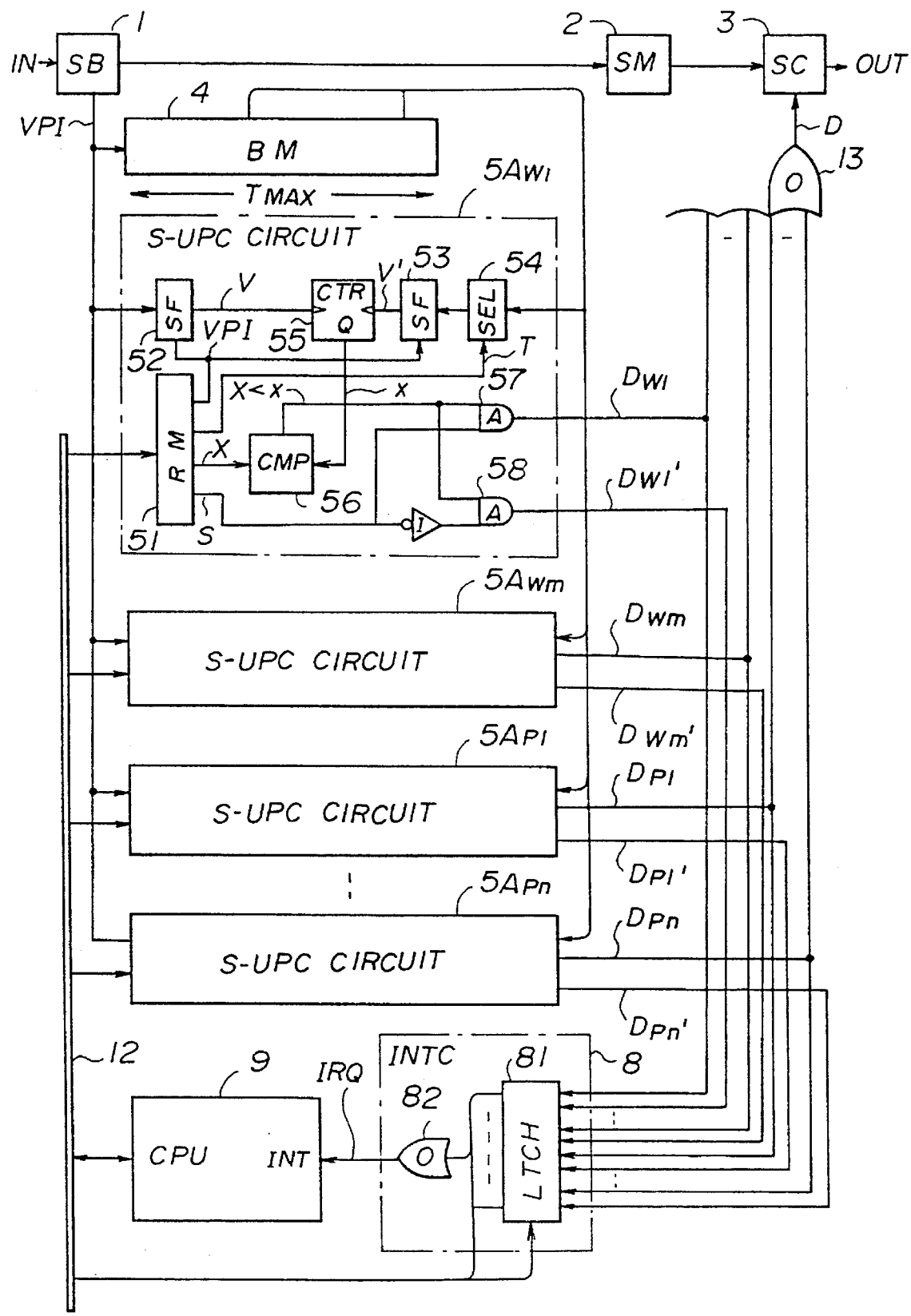
FIG.5 illustrates a detailed configuration of the fault diagnosis system according to the first embodiment.

FIG.5 illustrates a detailed configuration of the fault diagnosis system according to the first embodiment, in which system a total of m operating UPC circuits and a total of n spare UPC circuits are provided, which UPC circuits are each equipped with one traffic measuring part 55, and the determination results of the UPC circuits are compared.

The system shown in FIG.5 comprises: the cell information branching part 1 (SB); the cell delay part 2 (SM); the cell control part 3 (SC); the bridge memory 4 (BM); operating S-UPC circuits $5A_{w1}-5A_{wn}$ and spare S-UPC circuits $5A_{p1}-5A_{pn}$, which circuits are each equipped with one traffic measuring part (55); an interruption handling part 8 (INTC); and a CPU 9 for setting various parameters in the UPC circuits and giving a fault diagnosis of the UPC circuits.

The CPU 9, set in a register memory (RM) 51 of the S-UPC circuits $5A_{w1}-5A_{pn}$ via a common bus 12, the VPI parameter of the cell, the order value of time interval T, a logic state value X relative to the cell count; and control information S for controlling operating/spare switching (hereinafter, simply called operating/spare control information). When a cell on the highway arrives at a point of time in such an arrangement, the cell information branching part 1 causes the VPI information to branch from the cell, and the cell delay part 2 delays the cell by a time period necessary for effecting the above-described determination.

Referring particularly to the operating S-UPC circuit $5A_{w1}$, the cell filter (SF) 52 makes a discrimination as to whether or not the VPI information that has branched agrees with the VPI parameter of its own, and, if there is an agreement, outputs the discrimination pulse V, thereby causing the count of the counter (CTR) 55 to be incremented. The bridge memory 4 keeps a chronological record of the VPI information going back a maximum cell time length of $T_{MAX}$, and on the basis of the order value of T, the selector (SEL) reads out, from the bridge memory 4, the VPI information going back a cell time length of T. The cell filter (SF) 53 makes a discrimination as to whether or not the read VPI information agrees with the VPI parameter of its own, and, if there is an agreement, outputs the discrimination pulse V', thereby causing the count of the counter 55 to be decremented. This way, the counter 55 continuously counts the number x of cells arriving during prescribed time intervals T having their phases shifted by $\Delta t$ with respect to each other, $\Delta t$ being the time required for one cell to pass. A signal indicating the cell count x output by the counter 55 is fed, when prompted by the discrimination pulse V, to the input of the comparator (CMP) 56, which comparator 56 compares the cell count x and the order value X.

The operating S-UPC circuit $5A_{w1}$ is operating-mode when the operating/spare control information S=1. The determination result then yielded by the comparator 56 is fed to the input of an OR gate circuit 13 via an AND gate circuit 57, thereby allowing actual control of the cells to be effected. Specifically, the cell control signal $D_{w1}$ output from the AND gate circuit 57 is equal to 1 when x>X holds. In response to this, the cell held at the cell delay part 2 has either a marking applied thereto or is abandoned by the cell control part 3. When x>X does not hold, the cell control signal $D_{w1}=0$. In response to this, the cell held at the cell delay part 2 is allowed to pass through the control part 3 unmodified. The cell control signal $D_{w1}$ is also fed to the input of the interruption handling circuit 8 and supplies, to the CPU 9, the information on the result of cell control.

When the operating/spare control information S=0, the operating S-UPC circuit $5A_{w1}$ is spare mode. The determination result then given by the comparator 56 is fed to the input of the interruption handling circuit 8 via the AND gate circuit 58 so that the CPU 9 may be supplied with information $D_{w1}'$ on the result of determination of cells. The same description holds true of the other S-UPC circuits $5A_{w2}-5A_{pn}$.

The CPU 9 effects control and determination of at least one kind of cell, using more than one system, and gives a fault diagnosis of the S-UPC circuits by comparing the determination results of the above systems. Specifically, when a cell arrives on the highway and at least one of the determination signals $D_{w1}-D_{pn}'$ of the S-UPC circuits $5A_{w1}-5A_{wm}, 5A_{p1}-5A_{pn}$ is generated, the signals are latched in a latch circuit (LTCH) 81 generally at the same moment. An OR gate circuit (O) 82 issues, by ORing the output from the latch circuit, an interruption request IRQ to the CPU 9. The CPU 9 reads out, by accepting this interruption request IRQ, the data latched in the latch circuit 81 via the common bus 12. The CPU then compares the polishing result output from the comparator 56 with the latched data, which result and data are derived from the same cell, and gives a diagnosis that there is a failure in the S-UPC circuit if no agreement is found as a result of this comparison.

It is also possible to assign the same VPI parameter to S-UPC circuits totalling an odd number greater than two and to remove the S-UPC circuit from the system, which circuit is determined to be defective by means of a decision by majority votes of the control results.

When a failure is detected in any of the operating S-UPC circuits $5A_{w1}-5A_{wm}$, it is possible to assign any of the spare S-UPC circuits $5A_{p1}-5A_{pn}$ to the operating system and to effect cell control therein.

A description will be given below of the fault diagnosis process of the CPU 9.

Figure 6:
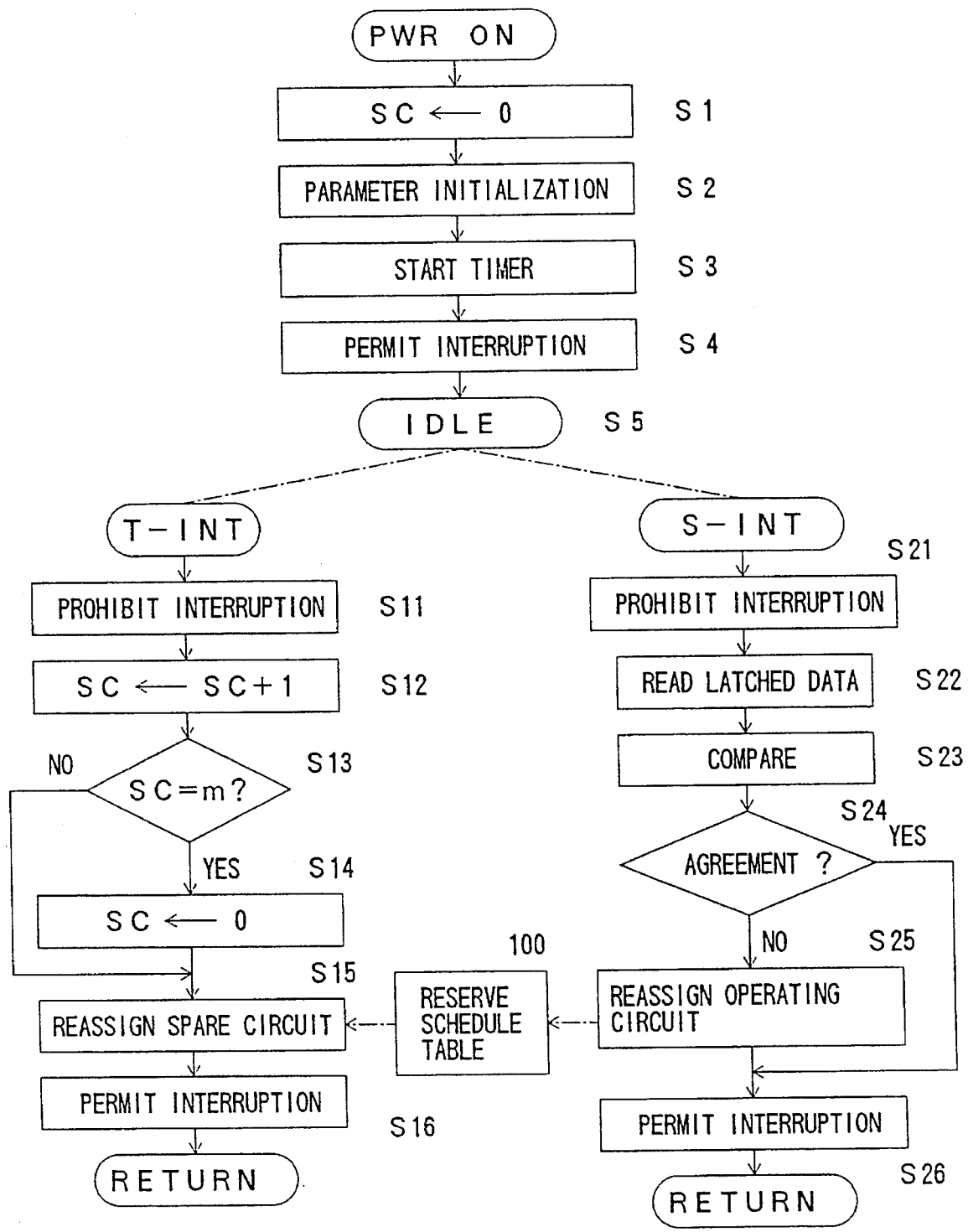
FIG.6 is a flow chart of a fault diagnosis process carried out by a CPU.

FIG.6 is a flow chart of a fault diagnosis process executed by the CPU. After being turned on, the system executes the process of "PWR-ON". First a schedule counter SC is reset (step 1), and parameters are initialized in all of the UPC circuits $5A_{w1}-5A_{pn}$ (step 2). The timer which has a predetermined time interval t set therein and is built into the CPU, is started (step 3), and an interruption from the timer or the outside, which interruption is based on a determination of cells, is permitted (step 4). The CPU 9 is then either put in an idle status or made to execute other processes (step 5).

When the timer interruption occurs at this stage, a T-INT process is initiated. Interruption is prohibited (step 11), and the count of the schedule counter SC is incremented (step 12). A determination is made as to whether or not the count of the schedule counter SC is equal to m (step 13). If SC=m, the schedule counter SC is reset (step 14). If SC=m does not hold, the process in step 14 is skipped. In accordance with the content of the schedule counter SC, a schedule shift is effected in which the combination of the operating UPC circuits and the spare UPC circuits is rearranged (step 15). As a result, a total of n spare UPC circuits is enough to perform sequential inspection of a total of m operating UPC circuits, n being smaller than m, thus enabling an efficient diagnosis. For example, one spare UPC circuit could diagnose a total of m operating UPC circuits on a regular basis at a frequency of (t×m). It is also possible to allow a spare schedule table 100 to be accessed by the schedule counter SC, and to allow the spare system mode to be changed in accordance with the spare schedule information thus read. This way, schedule shift is easily carried out even in the complex case where an operating UPC circuit is defective and a spare UPC circuit is used in its place in the operating system. The spare schedule table 100 is rewritable. The system executes the next step (step 16) where an interruption requesting an assignment of a spare circuit to the operating system is permitted, and returns to the main routine.

Upon occurrence of an interruption (step 4) corresponding to the determination, the system executes the S-INT process. Interruption is prohibited (step 21), and the data latched in the latch circuit 81 is read out (step 22). The polishing result input to the latch circuit 81 and the latched data read out in the above step are compared (step 23), and a determination is made as to whether or not the determination results of an operating UPC circuit and of at least one spare UPC circuit are in agreement (step 24). If no agreement is found, the system executes step 25, where a process of, for example, switching to a different UPC circuit is executed. If necessary, the spare schedule table 100 is updated. The spare schedule table 100 has its content updated when there is any change in the number of operating circuits. Specifically, the overall system assumes that a total of n spare circuits are provided in correspondence to a total of m operating circuits, and an increase in the number m of the operating circuits under the condition that the total number (m+n) of circuits remains unchanged results in a change (reduction) in the number n of spare circuits, thus necessitating the refreshing of the spare schedule table 100. Also, a failure occurring in a particular operating system results in a reduction of the number of spare circuits because there is no need to monitor the operating circuit in which the failure has occurred nor to monitor the spare circuit corresponding thereto, and because a spare circuit is reassigned as an operating circuit. Hence, there is a need for updating the spare schedule table 100.

Subsequently, when it is found in step 24 that there is an agreement in the determination results, step 25 is skipped. In step 26, interruption is permitted, and the system then returns to the main routine.

FIG.7 shows examples of diagnoses given in accordance with determination results. It is assumed, for example, that the operating S-UPC circuit $5A_{w1}$ has the VPI parameter of 1 and the operating/spare control information thereof S=1 (operating). It is also assumed that the S-UPC circuit $5A_{w2}$ has the VPI parameter of 2 and S=1. Since the VPI parameter of the S-UPC circuit $5A_{w3}$ is assumed to be 0, the S-UPC circuit $5A_{w3}$ is unused. Therefore, the operating/spare information S does not have any meaning. An alternative configuration is such that control information indicating use/disuse of the S-UPC circuit is employed instead of setting the VPI parameter to be 0.

It is assumed that the VPI parameter of the spare S-UPC circuit $5A_{p1}$ is 1 and S thereof is 0 (meaning that this circuit also serves as the spare circuit for the circuit $5A_{w1}$). It is also assumed that the S-UPC circuits $5A_{p2}$, $5A_{p3}$ both have the VPI parameters of 2 and S thereof is 0 (meaning that the these circuits also serve as the spare circuits for $5A_{w2}$).

In Case $C_1$, the determination results of all of the UPC circuits $5A_{w1}$–$5A_{p3}$ are 0, meaning that there is no interruption. Since all of the outputs are in agreement, there is no need for the CPU 9 to make any comparison. In Case $C_2$, an interruption occurs because the operating S-UPC circuit $5A_{w1}$ has generated the cell control signal $D_{w1}$. In response to this, the CPU 9 reads out the data latched in the latch circuit 81 and makes a comparison. The signal $D_{w1}$ from the S-UPC circuit $5A_{w1}$ and that from the S-UPC circuit $5A_{p1}'$ are in agreement because the operations of the operating circuit and the spare circuit are the same. Consequently, no agreement is found in Case $C_2$ in which $D_{w1}=1$, while $D_{p1}'=0$. The CPU 9 thus is able to determine that either the S-UPC circuit $5A_{w1}$ or the S-UPC circuit $5A_{p1}$ is defective.

In Case $C_3$, an agreement is not found in while $D_{w1}=0$, while $D_{p1}'=1$. Therefore, a diagnosis that there is a failure results. In Case $C_4$, an agreement is found in which $D_{w1}=1$ and $D_{p1}'=1$. Therefore, the CPU 9 gives a diagnosis that both S-UPC circuits $5A_{w1}$ and $5A_{p1}$ are operating normally.

In Case $C_5$, the signal $D_{w2}$ of the S-UPC circuit $5A_{w2}$ is 1 and the signal $D_{p2}'$ of the S-UPC circuit $5A_{w2}$ as well as the signal $D_{p3}'$ of the S-UPC circuit $5A_{p3}$ are both 0. By means of a decision by majority, a diagnosis that there is a failure in the operating S-UPC circuit $5A_{w2}$ is given. It is also possible in this case for the control information S of the spare S-UPC circuit $5A_{p2}$ to be set to 1 so that the S-UPC circuit $5A_{p2}$ may be used as part of the operating system, and for the VPI parameter of the operating S-UPC circuit $5A_{w2}$ to be set to 0 so that the same circuit may not be used. Diagnoses for the other cases can be similarly given. That is, the diagnoses that the following circuits are defective are given: the spare S-UPC circuit $5A_{p2}$ in Case $C_5$; the spare S-UPC circuit $5A_{p3}$ in Cases $C_7$, $C_8$; the spare S-UPC circuit $5A_{p1}$ in Case $C_9$; and the operating S-UPC circuit $5A_{w2}$ in Case $_{10}$. In case $C_{11}$, the following signals are in agreement: an agreement: the signal $D_{w2}$ of the operating S-UPC circuit $5A_{w2}$, the signal $D_{p2}'$ of the spare S-UPC circuit $5A_{p2}$ and the signal $D_{p3}'$ of the spare S-UPC circuit $5A_{p3}$, which signals are all 1. In response to this, the CPU 9 can give a diagnosis that the S-UPC circuits $5A_{w2}$, $5A_{p2}$ and $5A_{p3}$ are all normal.

A description of a second embodiment of the present invention will now be given.

Figure 8:
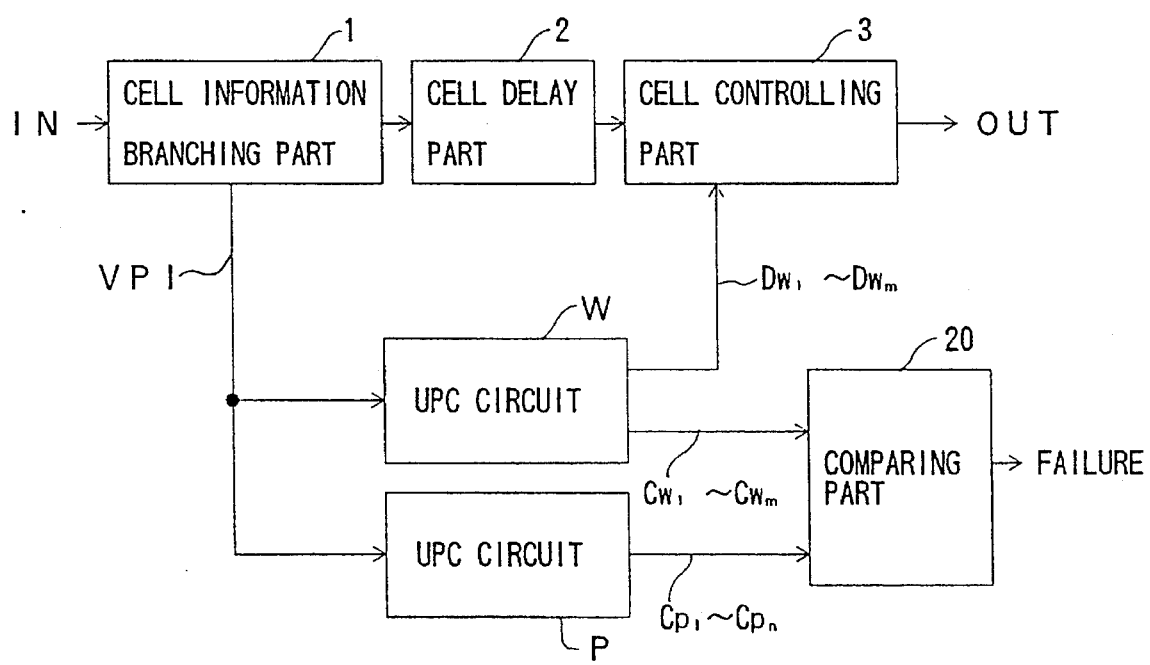
FIG.8 illustrates a structural outline of the fault diagnosis system according to a second embodiment of the present invention.

Referring to FIG.8, a cell arriving at the cell information branching part 1 has its VPI information, and the like, branched, one branch of information being fed to the input of the cell delay part 2. The other branch of information is fed to the input of the operating and spare UPC circuits W and P, respectively. The operating UPC circuit W is configured so as to enable control of a total of m kinds of cells, and the spare UPC circuit P is configured so as to enable traffic measurement of a total of at least n kinds of cells.

The UPC circuit W performs traffic measurement of at least one kind of cell, using more than one system. The comparing part 10 makes a comparison between the traffic measurement results $C_{w1}$–$C_{wn}$, $C_{p1}$–$C_{pn}$ of the UPC circuit W and the UPC circuit P, respectively, so that a diagnosis of the UPC circuits may be given.

While, in the first embodiment, a diagnosis is given by comparing the determination results of the operating and spare UPC circuits, in this second embodiment, as the UPC circuits are configured to measure traffic, a diagnosis is given by the comparing part 20 comparing the traffic measurement results delivered from the UPC circuits.

Upon accepting, from the operating UPC circuit W, the signals $D_{w1}$–$D_{wn}$ resulting from effecting determination of cells, the cell control part 3 applies a marking to or abandons the cell held at the cell delay part 2 when the signals $D_{w1}-D_{wn}$ are in a "true" state, while allowing the cell to pass unmodified through the cell delay part 2 when the signals $D_{w1}-D_{wn}$ are in a "false" state.

Figure 9:
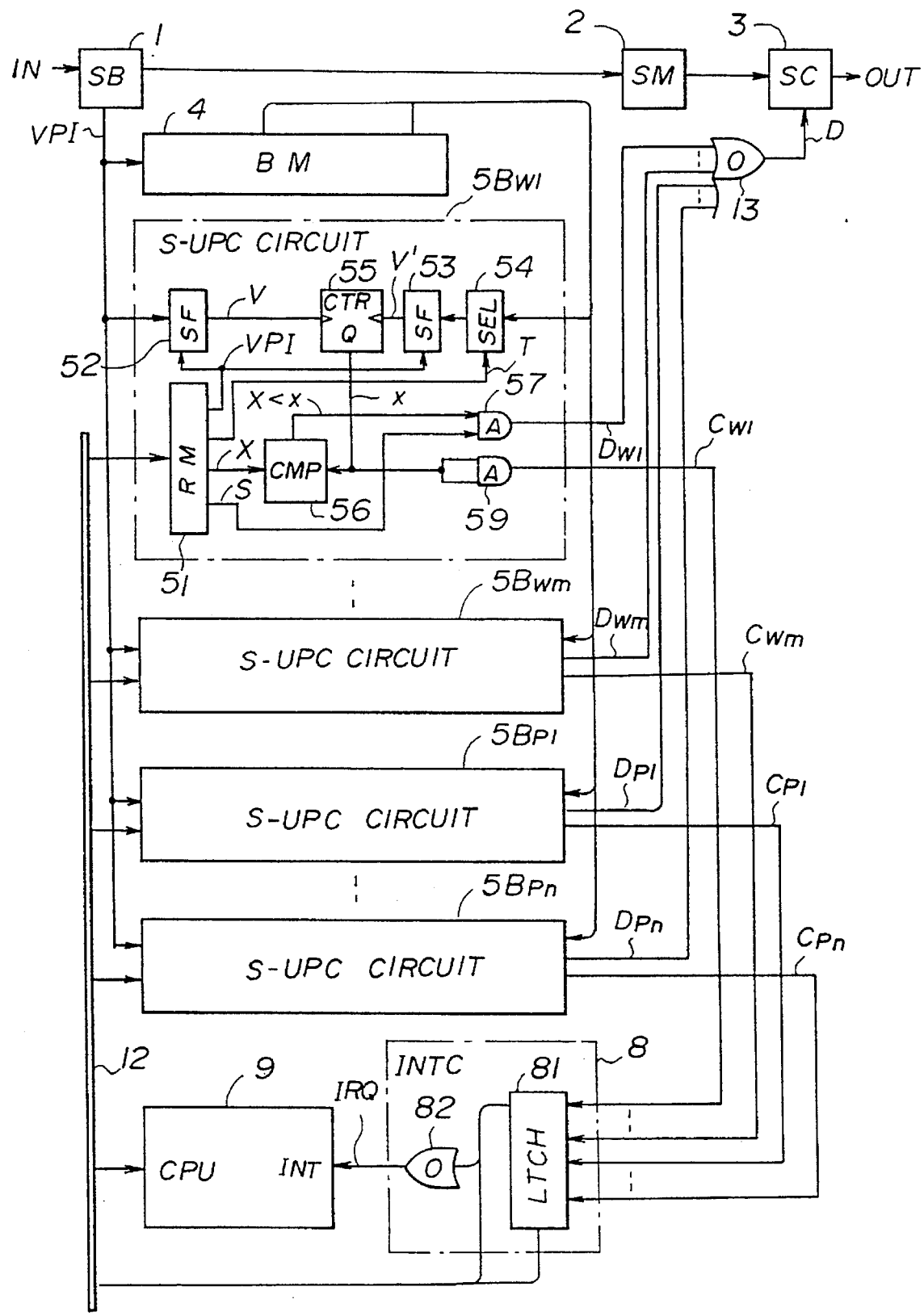
FIG.9 illustrates a detailed configuration of the fault diagnosis system according to the second embodiment.

FIG.9 illustrates a configuration of the fault diagnosis system according to the second embodiment, in which system the traffic measurement values are compared. The system of FIG.9 comprises operating S-UPC circuits $5B_{w1}-5B_{wm}$ each equipped with one traffic measuring part; spare S-UPC circuits $5B_{p1}-5B_{pn}$ each equipped with one traffic measuring part; the interruption handling circuit 8 (INTC); and the CPU 9 for setting various parameters in the UPC circuits and for giving fault diagnosis of the UPC circuits.

Referring particularly to the S-UPC circuit $5B_{w1}$, the operating S-UPC circuit $5B_{w1}$ is used as part of the operating system when the operating/spare control signal S=1. The determination result then output from the comparator 56 is fed to the input of the OR gate circuit 13 via the AND gate circuit 57, thereby allowing control of the cells to be executed.

When the operating/spare control signal S=0, the operating S-UPC circuit $5B_{w1}$ is used as part of the spare system. In this case, the ANDing at the AND gate circuit 57 does not produce a signal, so that no control of cells is executed. When prompted by the generation of the discrimination pulse V, the counter 55 outputs the signal x indicating the cell count. The signal $C_{w1}$ indicating the cell count is output from the AND gate circuit 59 regardless of whether the S-UPC circuit $5B_{w1}$ is used as part of the operating system or as part of the spare system. The same description holds true of the other S-UPC circuits $5B_{w2}-5B_{pn}$.

The UPC circuits $5B_{w1}-5B_{wm}$, $5B_{p1}-5B_{pn}$ carry out control and traffic measurement of at least one kind of cell, using more than one system. The CPU 9 gives a fault diagnosis of the S-UPC circuits by comparing the traffic measurement results. Specifically, when a cell arrives on the highway, causing at least one of the traffic measurement results $C_{w1}-C_{pn}$ to be generated from the S-UPC circuits $5B_{w1}-5B_{pn}$, these measurement results $C_{w1}-C_{pn}$ are latched in the latch circuit 81. An OR gate circuit 82 of the interruption circuit 8 issues an interruption request IRQ to the CPU 9 by ORing the output of the latch circuit 81. The CPU 9, upon accepting this interruption request IRQ, reads out the data latched in the latch circuit 81 via the common bus 12. Further, the CPU 9 compares the traffic measurement results derived from the same cell, and, if there is no agreement, gives a diagnosis that the UPC circuit is defective. It is also possible for the CPU 9 to assign the same VPI parameter to UPC circuits totaling an odd number greater than 2 and to remove the UPC circuit from the system, which UPC circuit is found to be defective by means of a decision by majority votes of the traffic measurement results. The spare UPC circuit can be used as part of the operating system so that polishing control may be effected, when a failure is detected in the operating UPC circuit.

FIG.10 shows examples of diagnosis given in accordance with traffic measurement results. For example, it is assumed that the operating S-UPC circuit $5B_{w1}$ has the VPI parameter of 1, and S thereof is 1 (operating). It is also assumed that the operating S-UPC circuit $5B_{w2}$ has the VPI parameter of 2, and S thereof is 1. Although the S-UPC circuit $5B_{w3}$ is an originally operating UPC circuit, it is used here as a spare circuit for the S-UPC circuit $5B_{w1}$. The spare S-UPC circuit $5B_{p1}$ is also used as a spare circuit for the S-UPC circuit $5B_{w1}$. Further, the spare S-UPC circuits $5B_{p2}$, $5B_{p3}$ are used as spare circuits for the S-UPC circuit $5B_{w2}$.

In Case $C_1$, the signals $C_{w1}-C_{p3}$ indicating the cell count are all 0 as they are output by the UPC circuits, meaning that no interruption arises. In Case $C_2$, the signals $C_{w1}$, $C_{w3}$ and $C_{p1}$ indicating the cell count are generated, such that an interruption arises. In response to this interruption, the CPU 9 reads out the data latched in the latch part 81, and compares the plurality of latched data thus read. Since the operating and spare S-UPC circuits operate the same way, the signals $C_{w1}$, $C_{w3}$ and $C_{p1}$ indicating the cell count should normally are in agreement. However, in Case $C_2$, the signal $C_{w1}$ is not in agreement with the other signals. Hence, a diagnosis that the operating S-UPC circuit $5B_{w1}$ is defective results. Similarly, Case $C_3$ produces a diagnosis that the S-UPC circuit $5B_{p1}$ is defective. In Case $C_4$, the signals $C_{w1}$, $Cw_3$ and $Cp_1$ indicating the cell count are in agreement. Accordingly, a diagnosis that all of the S-UPC circuits $5B_{w1}$, $5B_{w3}$ and $5B_{p1}$ are operating normally results. The same description is true of Cases $C_5-C_{11}$.

The second embodiment enables specific knowledge of the state of a failure to be acquired because the traffic measurement results are compared, and enables early failure detection that does not depend on the cell determination results.

Figure 11:
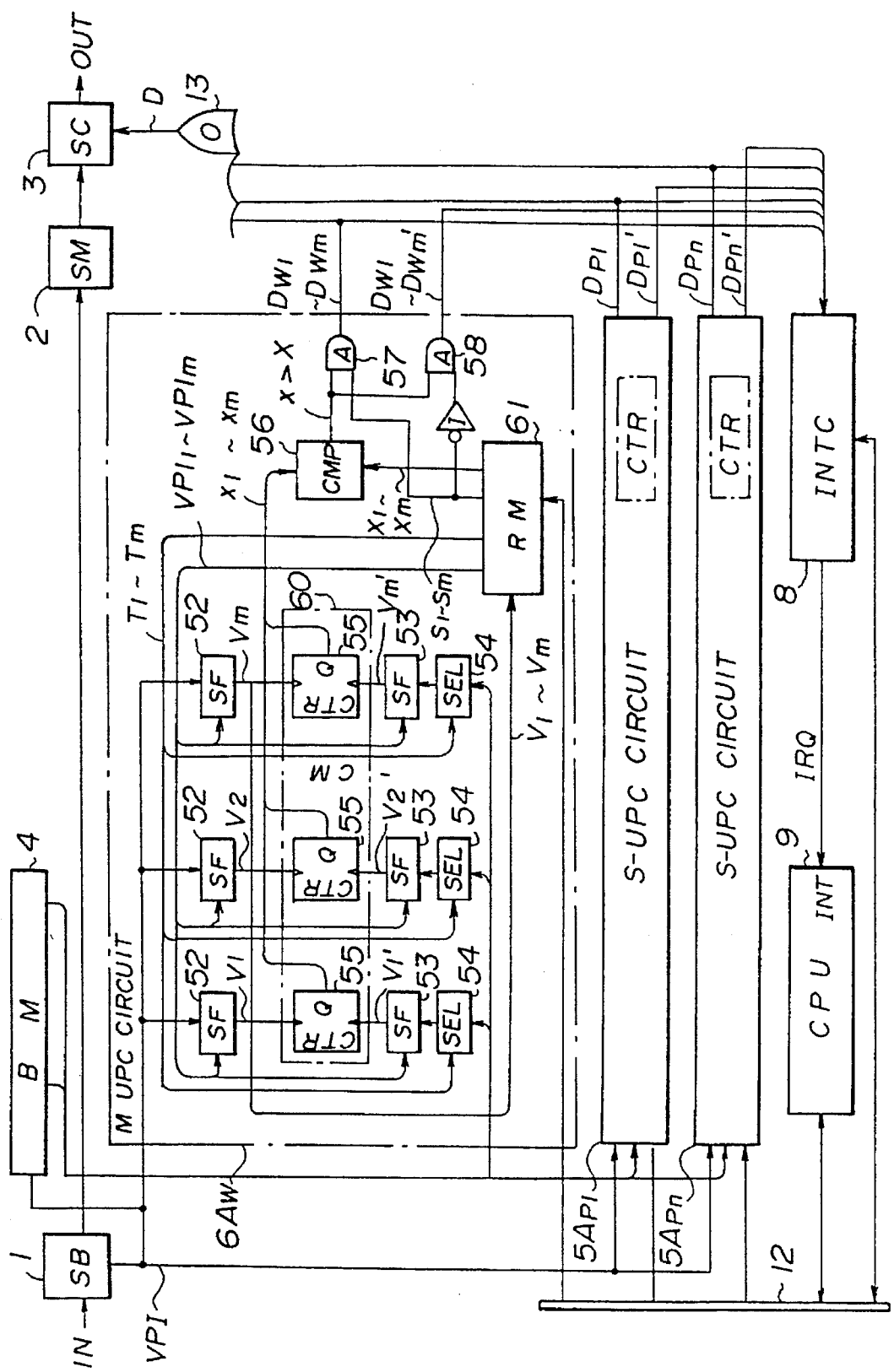
FIG.11 illustrates a configuration of the fault diagnosis system according to a third embodiment of the present invention.

FIG.11 illustrates a configuration of the fault diagnosis system according to a third embodiment, in which system an operating UPC circuit having a total of m traffic measuring parts and a total of n spare UPC circuits each having one traffic measuring part is provided. The cell determination results are compared by these circuits.

The system of FIG.11 comprises: a double-duty UPC circuit $6A_w$ having a total of m traffic measuring parts; the spare UPC circuits $5A_{p1}-5A_{pn}$; the CPU 9; and the interruption circuit 8.

Referring to the M-UPC circuit $6A_w$, the CPU 9 sets the following in a register memory (RM) 61: the VPI parameters $VPI_1-VPI_m$ relative to a total of m traffic measuring parts; order values of time intervals $T_1-T_m$; order values of cell counts $X_1-X_m$; and operating/spare control information $S_1-S_m$. The parameters $VPI_1-VPI_m$ and the order values of time intervals $T_1-T_m$ are continuously output. The order values of cell counts $X_1-X_m$ and the operating/spare control information $S_1-S_m$ are output when prompted by the input of discrimination pulses $V_1-V_m$ output from the cell filter 52.

When the operating/spare control information $S_1=1$, the traffic measuring part related to the discrimination pulse $V_1$ output from the cell filter 52 operates as part of the current system. The determination result $(x_1>X_1)$ then yielded by the comparator 56 are input to the OR gate circuit 13 via the AND gate circuit 57 so that the cell polishing control is actually performed. Further, the cell control signal $D_{w1}$ output from the AND gate circuit 57 is also input to the interruption handling circuit 8 so that the CPU may be supplied with the information on the usage parameter control result.

When the control information $S_1=0$, the traffic measuring part related to the discrimination pulse $V_1$ is used as part of the spare system. The determination results $(x_1>X_1)$ then yielded by the comparator 56 are input to the interruption handling circuit 8 via the AND gate circuit 58 so that the CPU 9 may be supplied with the signal $D_{w1}'$ indicating the determination result. The same description is true of the other traffic measuring parts related to the other discrimination pulses $V_2-v_m$. It is found from this that the traffic measuring parts of the M-UPC circuit $6A_w$ correspond to the S-UPC circuits $5A_{w1}-5A_{wm}$ of the first embodiment.

The CPU 9 carries out control and polishing determination of at least one kind of cell, using more than one system, and gives, by comparing the determination results, a fault diagnosis of the traffic measuring parts of the M-UPC circuit $6A_w$ and of the S-UPC circuits $5A_{p1}$–$5A_{pn}$. The defective traffic measuring part that should be removed from the system may be determined by assigning more than one S-UPC circuit as spare circuits for one operating traffic measuring part and making a decision by majority votes of them.

When a failure is detected in a traffic measuring part of the M-UPC circuit $6A_w$, the VPI parameter of that traffic measuring part may be set to be 0 (disuse), whereupon a spare S-UCP circuit may be reassigned as the operating circuit, so that control of cells may be effected. The third embodiment enables the single M-UPC circuit $6A_w$ to carry out a total of m kinds of cells control, the therefore the operating circuit is miniaturized and operates more efficiently.

Figure 12:
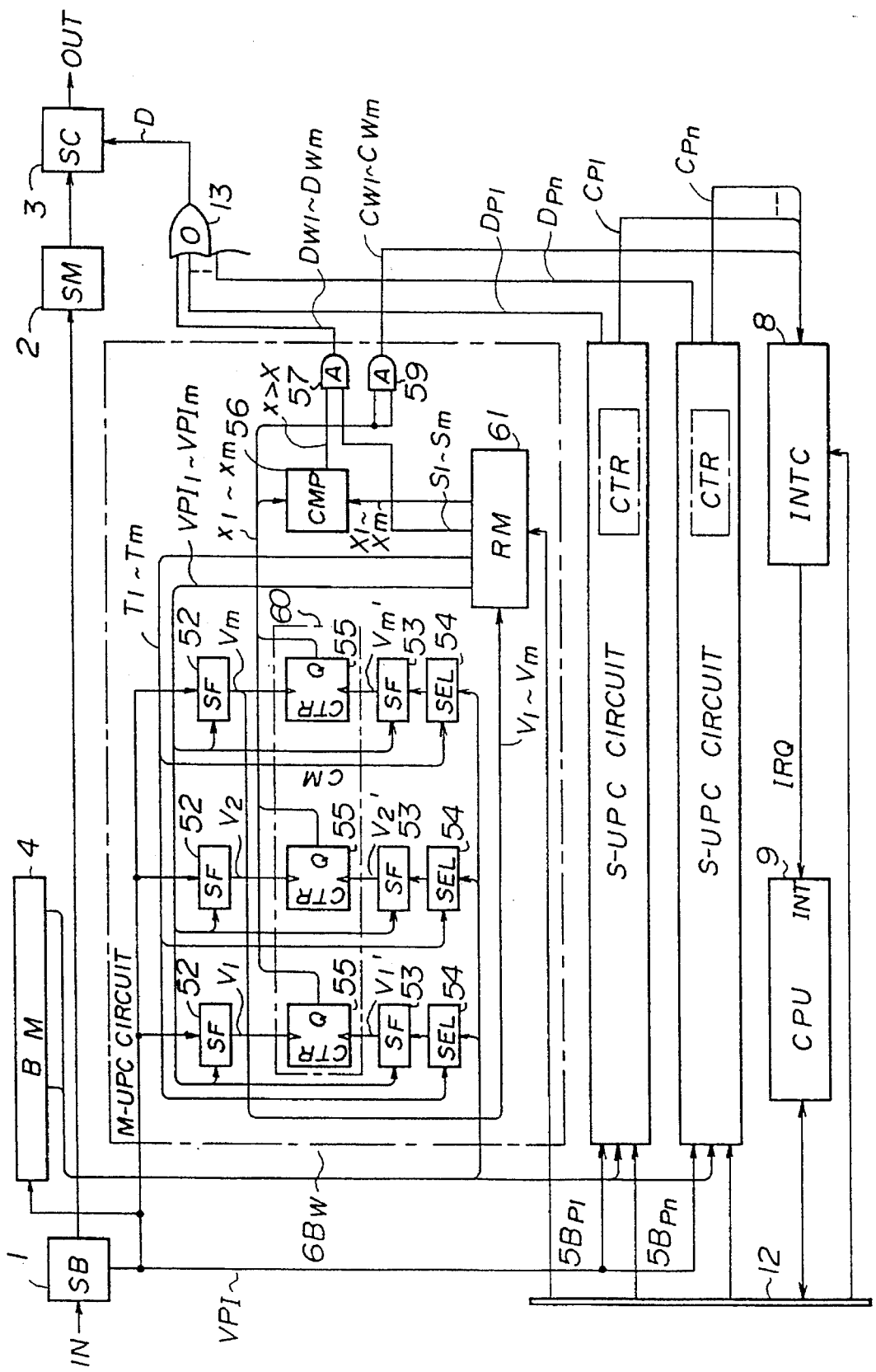
FIG.12 illustrates a configuration of the fault diagnosis system according to a fourth embodiment of the present invention.

FIG.12 illustrates a configuration of the fault diagnosis system according to a fourth embodiment, in which system the traffic measurement results are compared. Referring to FIG.12, an M-UPC circuit $6B_w$ is the operating UPC circuit equipped with a total of m traffic measuring parts. This embodiment comprises: an M-UPC circuit $6B_w$; spare UPC circuits $5A_{p1}$–$5A_{pn}$; the CPU 9; and the interruption circuit 8.

This embodiment and the third embodiment differ in terms of the configurations of the respective M-UPC circuit $6B_w$ and $6A_w$ such that this embodiment allows a diagnosis to be given by comparing the traffic measurement results, while the third embodiment allows a diagnosis to be given by comparing the determination results.

Referring to the M-UPC circuit $6B_w$, the traffic measuring part, related to the discrimination pulse $V_1$ output from the cell filter 52, operates as part of the operating system, when the control information $S_1=1$. The determination result $(x_1>X_1)$ then yielded by the comparator 56 is input to the OR gate circuit 13 via the AND gate circuit 57, so that control of the cell is effected.

When the control information $S_1=0$, the traffic measuring part related to the discrimination pulse $V_1$ operates as part of the spare system. In this case, the AND gate circuit 57 is OFF and no control of the cell is effected. The signal $x_1$, which indicates the cell count and is output from the counter 55 related to the discrimination pulse $V_1$, is ON upon the generation of the discrimination pulse $V_1$, causing the signal $C_{w1}$ indicating the cell count to be output from the AND gate circuit 59, regardless of whether the traffic measuring part related to the discrimination pulse $V_1$ is operating as part of the operating system or as part of the spare system. The same description holds true of the other traffic measuring parts related to the other discrimination pulses $V_2$–$V_m$.

The CPU 9 carries out control and traffic measurement of at least one kind of cell, using more than one system, and gives, by comparing the traffic measurement results thereof, a fault diagnosis of the traffic measuring parts of the M-UPC circuit $6B_w$ and the S-UPC circuits $5B_{p1}$–$5B_{pn}$. In addition to the advantages that derive from the third embodiment, the fourth embodiment enables specific knowledge of the state of a failure in the traffic measuring part to be acquired, and enables early failure detection that does not depend on the determination results.

Figure 13:
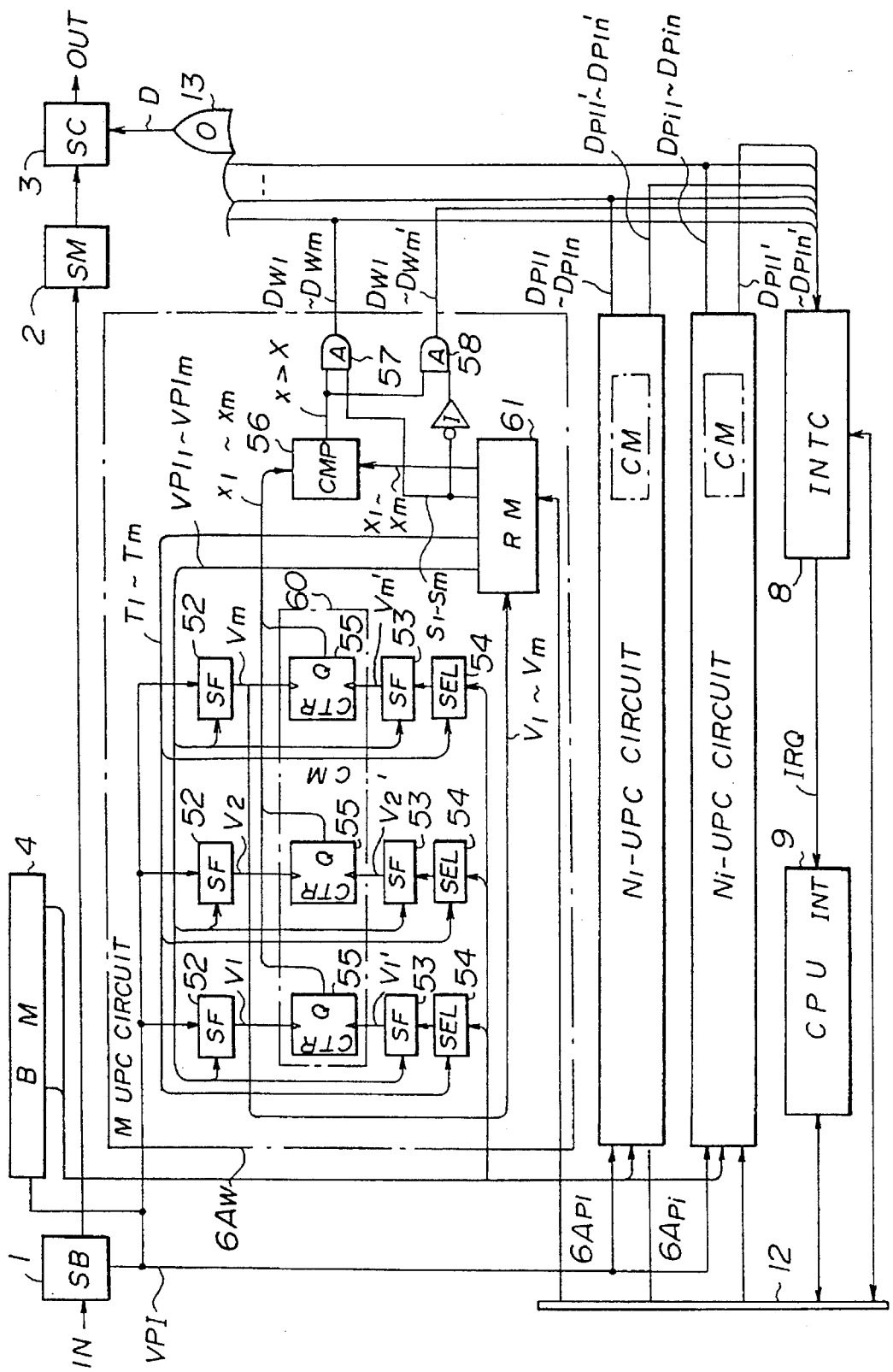
FIG.13 illustrates a configuration of the fault diagnosis system according to a fifth embodiment of the present invention.

FIG.13 illustrates a configuration of the fault diagnosis system according to a fifth embodiment. This embodiment comprises: the operating UPC circuit $6A_w$ equipped with a total of m traffic measuring parts; and a total of i spare $N_1$–$N_i$ UPC circuits $6A_{p1}$–$6A_{pi}$ equipped with a total of n traffic measuring parts. The determination results of these circuits are compared. Referring to FIG.13, each of the spare UPC circuits $6A_{p1}$–$6A_{pi}$ is equipped with a total of n traffic measuring parts. The spare circuits are of the same configuration as the operating M-UPC circuit $6A_w$, except that the numbers of their respective traffic measuring parts are different from that of the circuit $6A_w$.

The CPU 9 gives a fault diagnosis of the traffic measuring part of the M-UPC circuit $6A_w$ and of the traffic measuring parts of the $N_1$–$N_i$ UPC circuits $6A_{p1}$–$6A_{pi}$ by effecting control and determination of at least one kind of cell, using more than one system, and comparing the determination results thereof.

It is possible to assign at least one spare traffic measuring part as a spare circuit for one operating traffic measuring part and to give a decision by majority votes of them so that the defective traffic measuring part may be removed from the system. When the traffic measuring part of the M-UPC circuit $6A_w$ is found to be defective, it is possible to effect control of cells by designating the VPI parameter of the defective traffic measuring part to be 0 (disuse) and to reassign a traffic measuring part of one of the $N_1$–$N_i$ UPC circuits used as part of the operating system. The fifth embodiment makes it possible to miniaturize the spare $N_1$–$N_i$ UPC circuits $6A_{p1}$–$6A_{pi}$, thus enabling efficient operation and advanced fault diagnosis owing to the large number of traffic measuring parts secured in the spare system.

Figure 14:
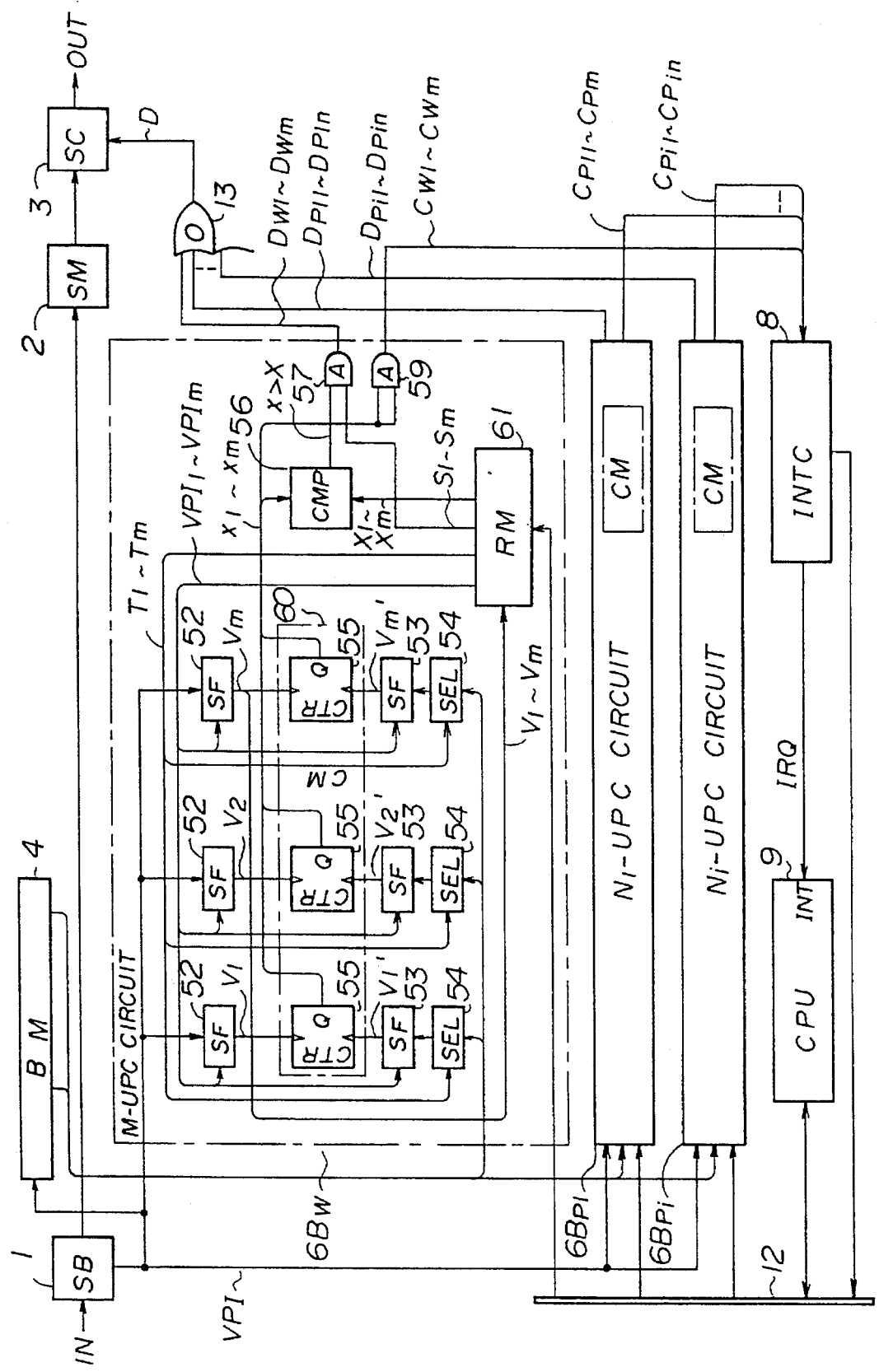
FIG.14 illustrates a configuration of the fault diagnosis system according to a sixth embodiment of the present invention.

FIG.14 illustrates a configuration of the fault diagnosis system according to a sixth embodiment, in which system the traffic measurement values are compared. Each of the spare $N_1$–$N_i$ UPC circuits $6B_{p1}$–$6B_{pi}$ shown in the figure is equipped with a total of n traffic measuring parts and is of the same configuration as the operating M-UPC circuit $6B_w$, except that the numbers of their respective traffic measuring parts are different from that of the circuit $6B_w$.

The CPU 9 gives a fault diagnosis of the traffic measuring parts of the M-UPC circuit $6B_w$ and of the traffic measuring parts of the $N_1$–$N_i$ UPC circuits $6B_{p1}$–$6B_{pi}$, by effecting polishing control and traffic measurement of at least one kind of cell, using more than one system, and comparing the traffic measurement results thereof. In addition to the determination of cells of the fifth embodiment, the sixth embodiment allows the traffic measurement results to be obtained by means of the traffic measuring parts and compared with each other by the CPU 9, thereby enabling specific knowledge of the state of a failure to be acquired and enabling early failure detection that does not depend on the determination results.

Figure 15:
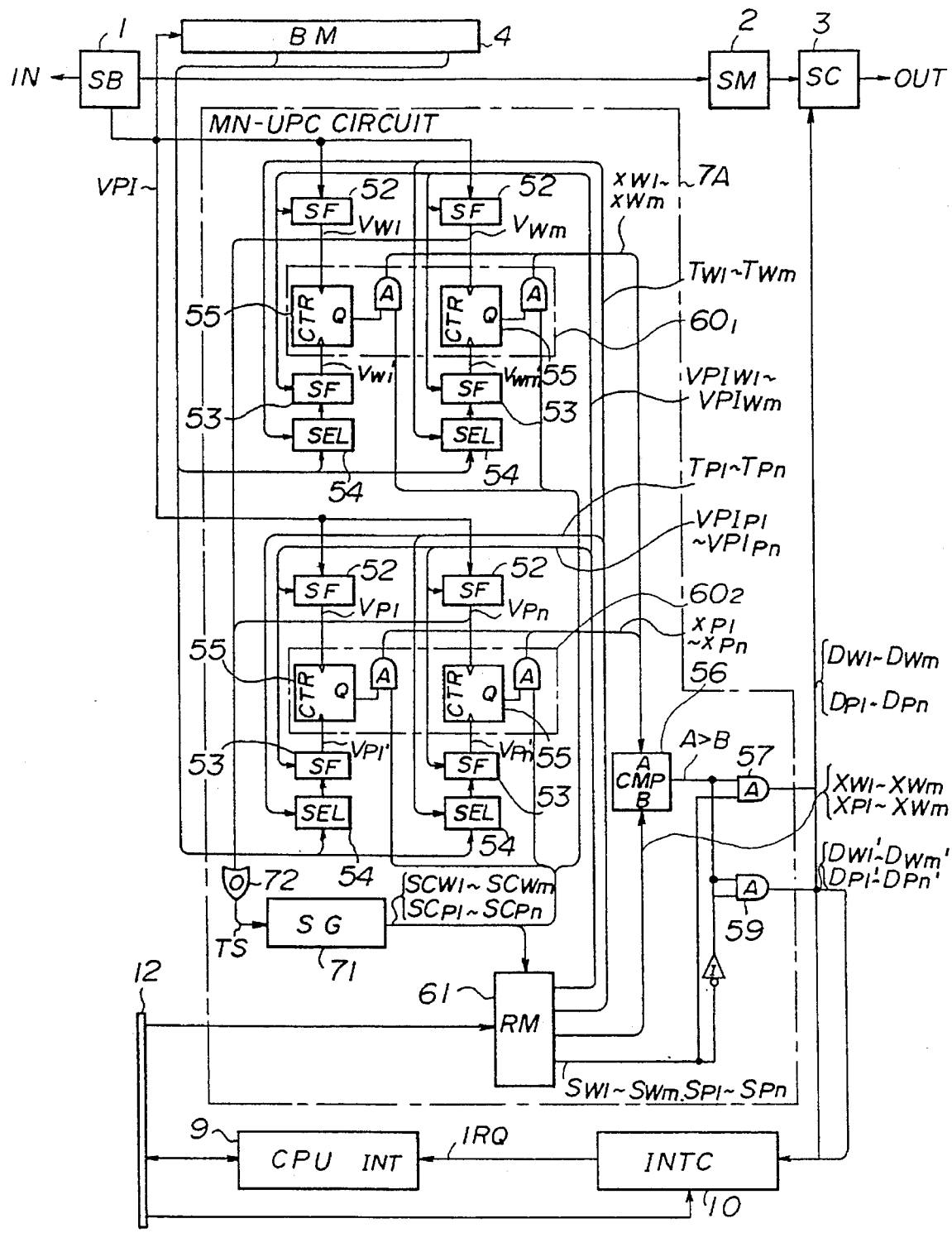
FIG.15 illustrates a configuration of the fault diagnosis system according to a seventh embodiment of the present invention.

FIG.15 illustrates a configuration of the fault diagnosis system according to a seventh embodiment, in which system a UPC circuit equipped with a total of m operating traffic measuring parts and a total of n spare traffic measuring parts is provided, and the determination results thereof are compared. The system of FIG.15 comprises an M-UPC circuit 7A equipped with a total of m operating traffic measuring parts and a total of n spare traffic measuring parts, an interruption handling circuit 10 for keeping a chronological record of generated signals without changing the phases thereof and for issuing an interruption to the CPU 9; and a scan signal generating part 71 (SG) for outputting a series of scan pulse signals $SC_{w1}$–$SC_{wm}$, $SC_{p1}$–$SC_{pn}$ each having different phases.

The register memory 61 stores VPI parameters $VPI_{w1}$–$VPI_{wm}$, $VPI_{p1}$–$VPI_{pn}$ relative to a total of m+n traffic measuring parts, which parameters are output from the CPU 9; order values of time intervals $T_{w1}$-$T_{wm}$, $T_{p1}$-$T_{pn}$; order values of cell counts $X_{w1}$-$X_{wm}$, $X_{p1}$-$X_{pn}$; and operating/spare control information $S_{w1}$-$S_{wm}$, $S_{p1}$-$S_{pn}$. The parameters $VPI_{w1}$-$VPI_{pn}$ and the order values of time intervals $T_{w1}$-$T_{pn}$ are continuously output from the register memory 61, but the order values of cell counts $X_{w1}$-$X_{pn}$ and the operating/spare control information $S_{w1}$-$S_{pn}$ are read out in response to the input of the scan pulse signals $SC_{w1}$-$SC_{pn}$.

Figure 16:
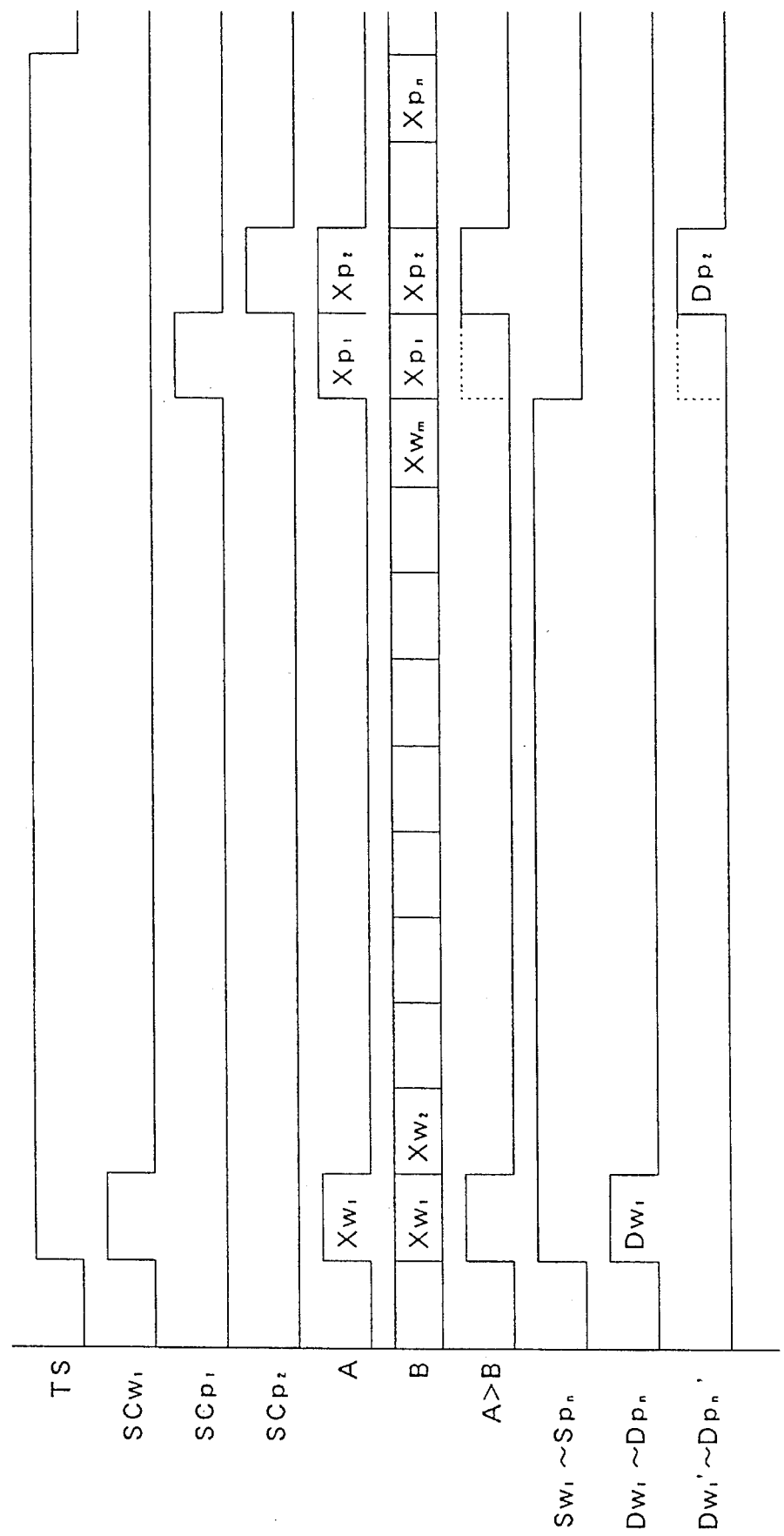
FIG.16 is a timing chart for the operation of the fault diagnosis system according to the seventh embodiment.

FIG.16 is an operational timing chart for a fault diagnosis system according to the seventh embodiment. The operation thereof will be described below, with reference to FIGS.15 and 16. It is assumed here that the traffic measuring part equipped with the cell filter 52 for outputting an operating discrimination pulse $V_{w1}$ is assigned to operate as part of the operating system, while the two traffic measuring parts equipped with the cell filter for outputting spare discrimination pulses $V_{p1}$, $V_{p2}$ are assigned to operate as part of the spare pulse.

When a cell arrives at the M-UPC circuit 7A at a certain time, the cell filter 52 recognizes the $VPI_i$ information and causes three traffic measuring parts to generate discrimination pulses $V_{wi}$, $V_{p1}$ and $V_{p2}$ at the same time. An OR gate circuit 72 ORs these pulses so as to form a trigger signal TS, the rise of the trigger signal causing the scan signal generating part 71 (SG) to output a series of scan pulse signals $SC_{w1}$-$SC_{pn}$ having different phases.

FIG.16 shows the scan pulse signals $SC_{w1}$, $SC_{p1}$ and $SC_{p2}$. These scan pulse signals $SC_{w1}$-$SC_{pn}$ are distributed to the AND gate circuit (A) of the counter 55 provided in each traffic measuring part. In this case, these scan pulse signals are generated when the discrimination pulses $V_{w1}$, $V_{p1}$ and $V_{p2}$ are output from the cell filter 52, so that the signals $x_{w1}$, $x_{p1}$ and $x_{p2}$, which indicate the cell count and are output from the counter 55, are read by utilizing time division. The scan pulse signals $SC_{w1}$-$SC_{pn}$ are also input to the register memory 61, so that the order values of cell counts $X_{w1}$-$X_{pn}$ and the operating/spare control information $S_{x1}$-$S_{pn}$ are read out from the register memory 61, which counts and information have the same phase. The comparator 56 compares the signals $x_{w1}$-$x_{pn}$ indicating the cell count with the order values $X_{w1}$-$X_{pn}$ in a sequential manner, and, if x>X holds, outputs "1". As shown in FIG.16, $x_{w1}$>$X_{w1}$, $x_{p1}$<$X_{p1}$, $x_{p2}$>$X_{p2}$. Accordingly, the AND gate circuit 57 outputs, to the cell control part 3 and to the interruption circuit 10, the cell control signal $D_{w1}$ responsive to the scan pulse signal $SC_{w1}$, and the AND gate circuit 58 outputs, to the interruption circuit 10, the determination signal $D_{p2}'$ responsive to the scan pulse signal $SC_{p2}$. The interruption handling circuit 10 stores the cell control signal $D_{w1}$ and the polishing determination signal $D_{p2}'$ without changing the phases thereof, and issues an interruption request to the CPU 9. Since the CPU 9 discriminates between the operating system and the spare system, it gives a diagnosis that there is a failure in the traffic measuring part related to the spare discrimination pulse $V_{p1}$.

The seventh embodiment enables polishing of a total of m+n kinds of cells to be effected by means of a single MN-UPC circuit 7A, thus facilitating miniaturization of the operating and spare circuits and, therefore, ensuring efficient operation. Since a total of k traffic measuring parts can be assigned to be used as part of the operating system, and the remaining (m+n)−k traffic measuring parts can be assigned to be used as part of the spare system, this MN-UPC circuit 7A is extremely flexible.

Figure 17:
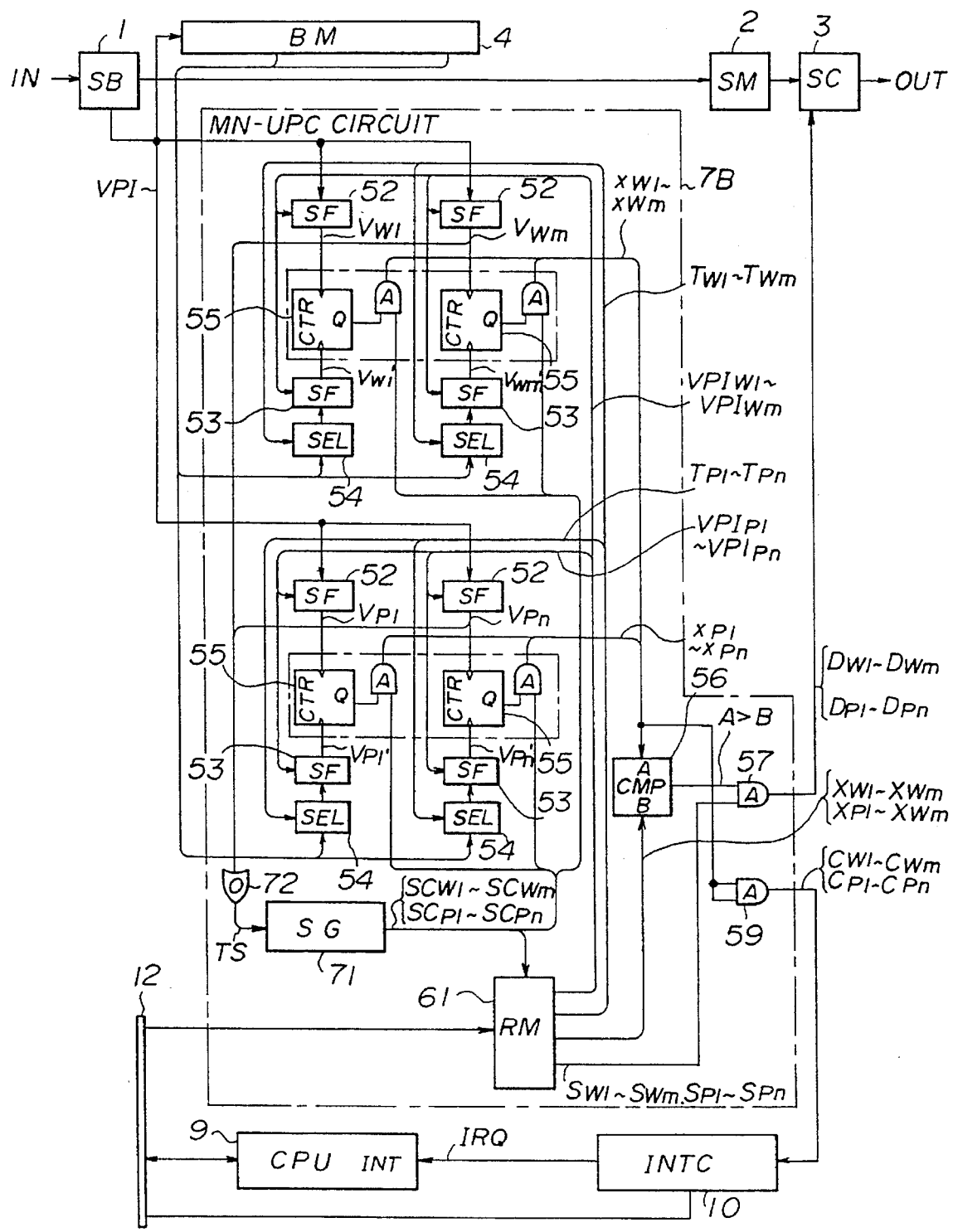
FIG.17 illustrates a configuration of the fault diagnosis system according to an eighth embodiment of the present invention.

FIG.17 illustrates a configuration Of the fault diagnosis system according to an eighth embodiment, in which system the traffic measurement results are compared. Referring to the system of FIG.17, an MN-UPC circuit 7B equipped with a total of m operating traffic measuring parts and a total of n spare traffic measuring parts is of the same configuration as the MN-UPC circuit 7A of FIG.16 except that 7B is configured such that the traffic measurement results can be compared.

While the seventh embodiment effects polishing determination, the eighth embodiment gives a fault diagnosis by comparing traffic measurement results. The two embodiments differ from each other in that, while the seventh embodiment allows the operating/spare control information $S_{w1}$-$S_{wm}$, $S_{p1}$-$S_{pm}$ stored in the register memory 61 to be input to the AND circuits 57, 58, the eighth embodiment allows it to be input only to the AND circuit 57. The AND circuit 57 outputs the traffic determination result signals $D_{w1}$-$D_{wm}$, $D_{p1}$-$D_{pn}$ in response to the input from the comparator 56 and the operating/spare control information $S_{w1}$-$S_{wm}$, $S_{p1}$-$S_{pm}$.

The AND circuit 59 is fed the input of the order values of cell counts $X_{w1}$-$X_{wm}$, $X_{p1}$-$X_{pn}$. The signals indicating the cell count are output to the interruption circuit 10 regardless of whether or not the scan pulse signal SC is present.

The eighth embodiment enables specific knowledge of the state of a failure in the traffic measuring part to be acquired by comparing not only the determination results, as in the seventh embodiment, but also the traffic measurement results, and enables early failure detection that does not depend on the determination results.

Figure 18:
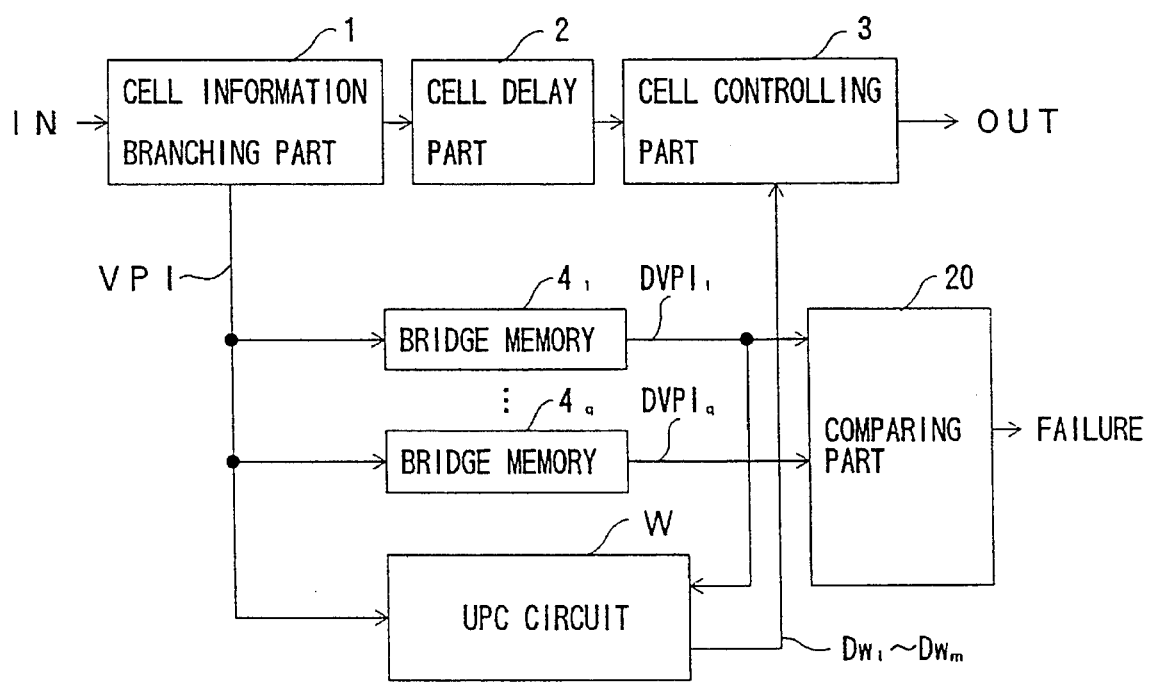
FIG.18 illustrates a structural outline of the fault diagnosis system according to a ninth embodiment of the present invention.

FIG.18 illustrates a structural outline of a fault diagnosis system according to a ninth embodiment. Referring to FIG.18, a cell arriving at the cell information branching part 1 has its VPI information and the like branched and then input to the cell delay part 2. One branch of VPI information is input to a total of q bridge memories $4_1$-$4_q$ and the operating UPC circuit W. For example, the bridge memory $4_1$ supplies the VPI information $DVPI_1$ output therefrom to the operating UPC circuit W, whereupon the operating UPC circuit W effects polishing control of a total of m kinds of cells, on the basis of the output VPI information $DVPI_1$ and the one branch of VPI information. A defect in the bridge memory $4_1$ may result in the whole UPC circuit W effecting incorrect control. It is impossible to determine, upon an occurrence of such an incorrect control, whether the UPC circuit W or the bridge memory $4_1$ is defective. Fault diagnosis of the bridge memories $4_1$-$4_q$ is made possible by comparing the contents of the bridge memories $4_1$-$4_q$, using more than one system. If it is found that the bridge memory $4_1$ is defective, a diagnosis that the operating UPC circuit W is operating normally results.

Figure 19:
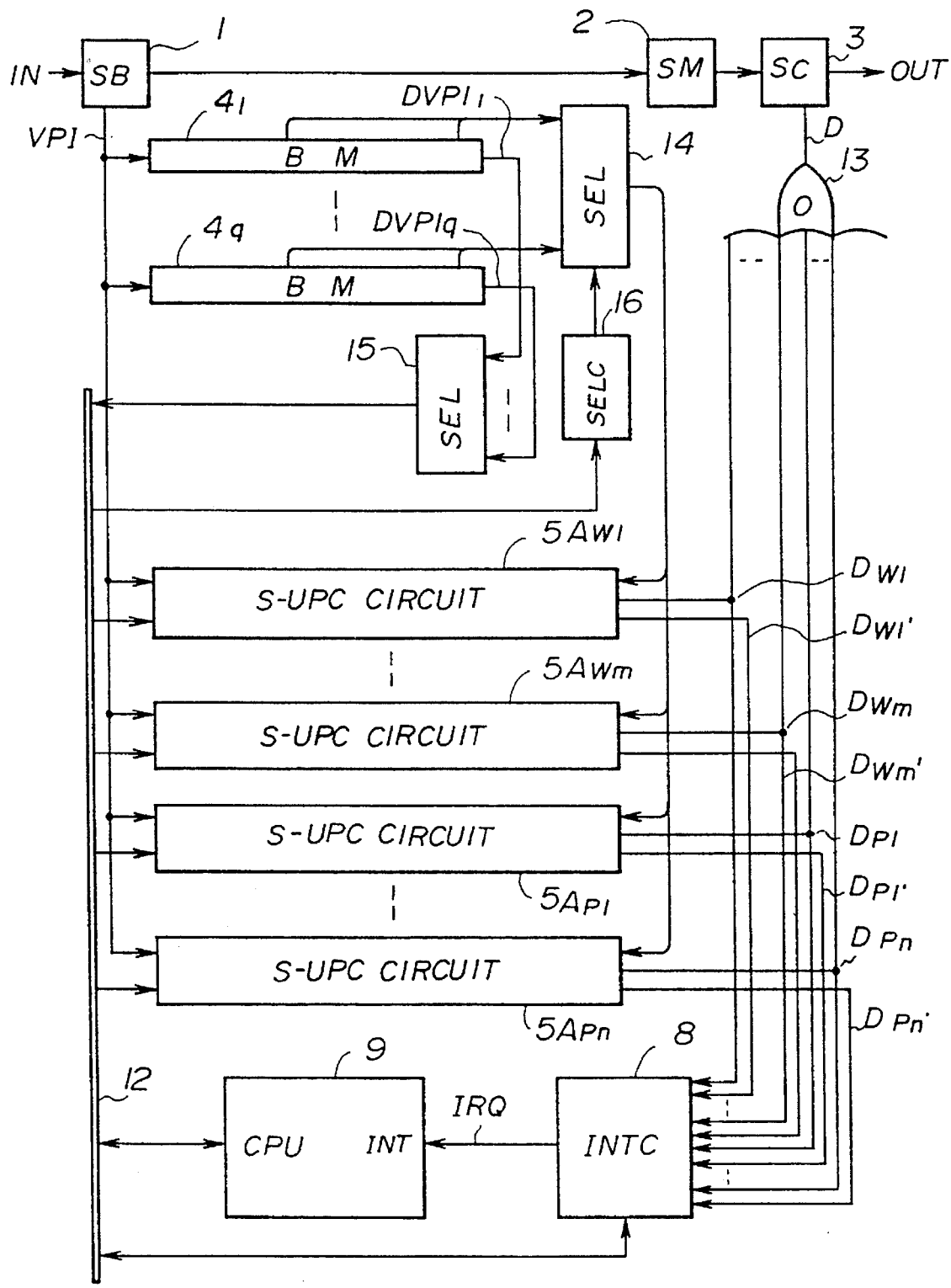
FIG.19 illustrates a detailed configuration of the fault diagnosis system according to the ninth embodiment.

FIG.19 illustrates a configuration of the fault diagnosis system according to the ninth embodiment, in which system a total of q bridge memories are provided and the contents thereof are compared. The system of this embodiment comprises the bridge memories $4_1$-$4_q$ (BM), selectors 14, 15, and a cell control part 16 (SELC).

A cell arriving at the cell information branching part 1 has its VPI information branched off, whereupon one branch of VPI information is input to the cell delay part 2. The other branch of VPI information is input to a total of q bridge memories $4_1$-$4_q$ and to the operating and spare S-UPC circuits $5A_{w1}$-$5A_{pn}$. The selector 16 selects one of the bridge memories on the basis of an instruction from the CPU 9. For example, assuming that the bridge memory $4_1$ is used as part of the operating system, the VPI information $DVPI_1$ output therefrom is supplied to the S-UPC circuits $5A_{w1}$–$5A_{pn}$. A defect in the bridge memory $4_1$ results in all of the UPC circuits $5A_{w1}$–$5A_{pn}$ effecting incorrect control. If no measures are taken, it is impossible to determine whether the UPC circuit or the bridge memory $4_1$ is defective.

A solution to this problem is for the CPU 9 to read out the contents of the bridge memories $4_1$–$4_q$ via the selector 15 and give a fault diagnosis of the bridge memories by comparing the read contents of a system with those of one or more other systems. The defective bridge memory that should be removed from the system may be determined by employing a decision by majority. If the bridge memory $4_1$ is found to be defective, a diagnosis that the S-UPC circuits $5A_{w1}$–$5A_{pn}$ are operating normally results. If this is the case, the CPU 9 instructs the control part 16 to select another bridge memory from among the bridge memories $4_2$–$4_q$.

Figure 1A:
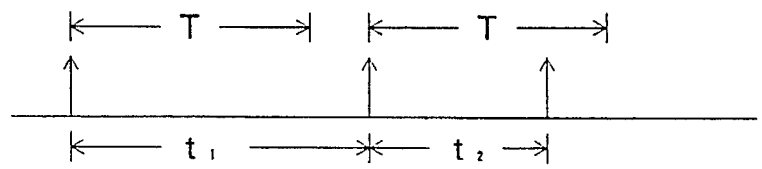
FIG.1A–C illustrates a conventional control system employing a time internal method.
Figure 1B:
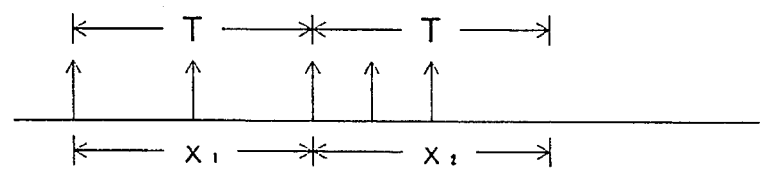
Figure 1C:
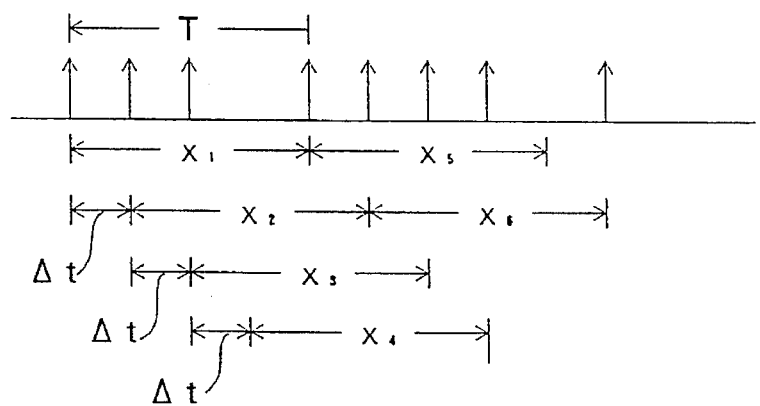
Figure 2A:
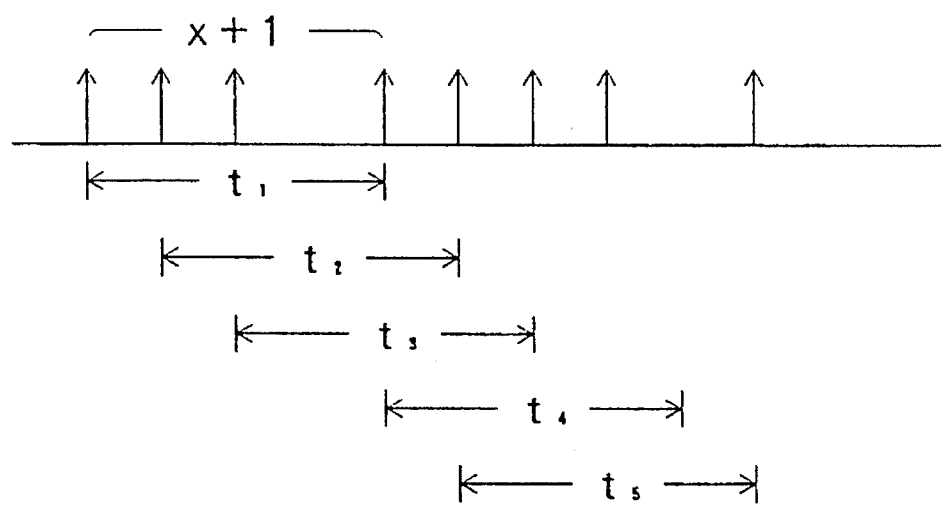
FIG.2A–B illustrates a conventional polishing control system employing a CAT-M method.
Figure 2B:
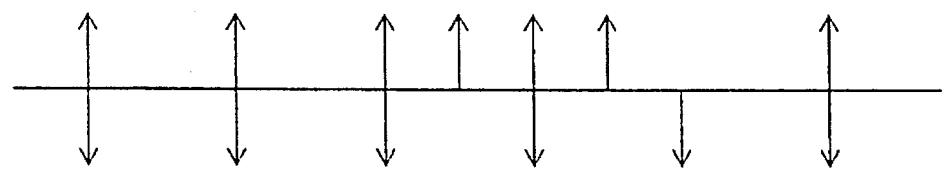
Figure 3:
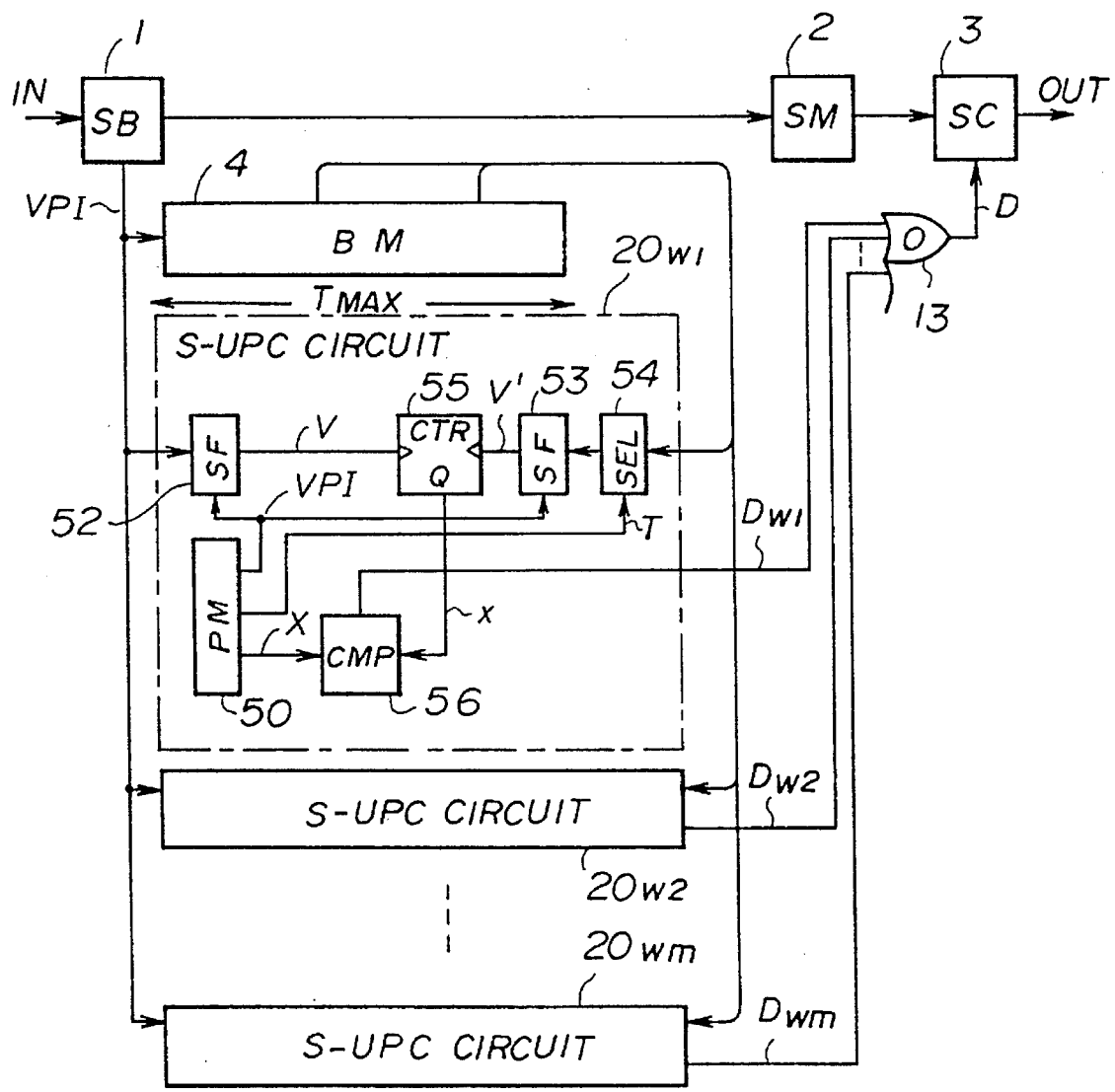
FIG.3 illustrates a configuration of the conventional control method.

While it is shown that the above embodiments are applied to the DB method, the present invention may also be applied to the other methods including the T-X of FIG.1(B) method, the CAT-M method of FIG.2(A) and the LB method of FIG.2(B).

While the above embodiments show several specific types of operating and spare UPC circuits, the present invention is not limited to these types. It is possible to configure various other types of UPC circuits and to use desired combinations of them so as to embody the operating and spare systems.

While a counter is used in the traffic measuring parts of the above embodiments, the traffic measuring parts are not limited to such a configuration. The function of a counter may alternatively be embodied by a RAM and an addition circuit or by software means controlled by the CPU.

As has been described, this invention enables accurate diagnosis of the UPC circuits to be given because determination of at least one cell is effected using more than one system, the determination results then being compared.

The present invention enables early failure detection that does not depend on the determination results because traffic measurement of at least one cell is effected for more than one system, the traffic measurement values then being compared.

The present invention is capable of accurate fault diagnosis of the bridge memories and accurate discrimination of a bridge memory failure and a UPC circuit failure, because the present invention comprises a total of q bridge memories, the contents of which are compared by using more than one system.

Further, the present invention is not limited to the embodiments described heretofore, and various variations and modifications may be made without departing from the scope of the invention.

What is claimed is:

1. A UPC circuit fault diagnosis system for controlling traffic of a cell on the basis of prescribed information about the cell which is one type of fixed-length packet in an asynchronous transfer mode (ATM), the system comprising:

a main system UPC circuit (W) for performing usage parameter control, by using a predetermined value and performing a determination of whether or not m kinds of cells have traffic surplus in respect to said predetermined value, and controlling the amount of traffic of said m kinds of cells flowing along a transfer path;

a standby system UPC circuit (P) for performing usage parameter control, by using a predetermined value and performing a determination of whether or not n kinds of cells have traffic surplus in respect to said predetermined value, and controlling the amount of traffic of said n kinds of cells flowing along the transfer path;

each circuit including judgement means for determining the amount of traffic of cells of one or more kinds which is flowing along the transfer path; and comparison means for comparing results of said judgement means of two UPC circuits and performing fault diagnosis of each UPC circuit.

2. The UPC circuit fault diagnosis system as claimed in claim 1, further comprising m number of such main system UPC circuits ($5_{w1}$–$5_{wm}$) as said main system UPC circuit and having a single traffic measurement means for measuring traffic of said cells, and n number of such standby system UPC circuits ($5_{p1}$–$5_{pn}$) as said standby system UPC circuit and having a single traffic measurement means.

3. The UPC circuit fault diagnosis system as claimed in claim 1, wherein said main system UPC circuit (6 Aw) has m number of traffic measurement means, and further comprising n number of standby system UPC circuits ($5_{p1}$–$5_{pn}$) having a single traffic measurement means.

4. The UPC circuit fault diagnosis system as claimed in claim 1, further comprising i number (where $i \leqq 1$) of standby system UPC circuits ($6_{p1}$–$6_{pn}$) having a $n_1$–$n_n$ number of traffic measurement means, and wherein said main system UPC circuit (6Aw) has m number of traffic measurement means.

5. The UPC circuit fault diagnosis system as claimed in claim 1, wherein said main UPC circuit has m number of main system traffic measurement means and n number of standby system traffic measurement means.

6. The UPC circuit fault diagnosis system as claimed in claim 1, wherein said main system UPC circuit and said standby system UPC circuit each includes traffic measurement means and wherein at least one of said main system UPC circuit (W) and said standby system UPC circuit (P) is configured so that functions thereof can be interchanged.

7. The UPC circuit fault diagnosis system as claimed in claim 6, wherein said main system UPC circuit (W) performs by k traffic measurement means usage parameter control of k kinds of cells, k being smaller than m, and the remaining 1 to m-k number of traffic measurement means function as standby system UPC circuits (P).

8. The UPC circuit fault diagnosis system as claimed in claim 1, further comprising means for switching to said standby system UPC circuit (P) when a fault is detected in said main system UPC circuit (W).

9. The UPC circuit fault diagnosis system as claimed in claim 1, wherein said main system UPC circuit (W) and said standby system UPC circuit (P) include traffic measurement means and are configured so that when specified, a used status or an unused status is given to each traffic measurement means.

10. The UPC circuit fault diagnosis system as claimed in claim 1, wherein said main system UPC circuit (W) and said standby system UPC circuit (P) include traffic measurement means and are configured so that an object cell can be changed with respect to each traffic measurement means.

11. The UPC circuit fault diagnosis system as claimed in claim 10, wherein means is provided for changing an object cell of said standby system UPC circuit (P) periodically.

12. The UPC circuit fault diagnosis system as claimed in claim 10, wherein changing an object cell of said standby system UPC circuit (P) is performed in accordance with information of a control table having information for selection of a standby system UPC circuit.

13. The UPC circuit fault diagnosis system as claimed in claim 1, wherein the same information in said systems is compared and a place of a fault in any UPC circuit is isolated by majority processing.

14. A UPC circuit fault diagnosis system for controlling cell traffic on the basis of prescribed information about a traffic of a cell which is one type of fixed-length packet in an asynchronous transfer mode (ATM), the system comprising:

a main system UPC circuit (W) for performing usage parameter control, by using a predetermined value to perform a determination of whether or not m kinds of cells have traffic surplus in respect to said predetermined value, and controlling the amount of traffic of said m kinds of cells flowing along a transfer path;

a standby system UPC circuit (P) for performing usage parameter control, by using a predetermined value to perform a determination of whether or not n kinds of cells have traffic surplus in respect to said predetermined value, and controlling the amount of traffic of said n kinds of cells flowing along the transfer path, each circuit including traffic measurement means for determining the traffic amount of cells of one or more kinds, which is flowing along the transfer path; and a comparison means for comparing said traffic amounts determined by said traffic measurement means of each system UPC circuit and performing fault diagnosis of each UPC circuit.

15. The UPC circuit fault diagnosis system as claimed in claim 14, comprising m number of main system UPC circuits ($5_{w1}$–$5_w$) having a single traffic measurement means, and n number of standby system UPC circuits ($5P_1$–$5P_n$) having a single traffic measurement means.

16. The UPC circuit fault diagnosis system as claimed in claim 14, wherein said main system UPC circuit (6Aw) has m number of traffic measurement means; and further comprising a ($5P_1$–$5P_n$) number of standby system UPC circuits having a single traffic measurement means.

17. The UPC circuit fault diagnosis system as claimed in claim 14, wherein said main system UPC circuit has m number of traffic measurement means, and i number of standby system UPC circuits having a ($n_1$–$n_n$) number of traffic measurement means.

18. The UPC circuit fault diagnosis system as claimed in claim 14, wherein said main system UPC circuit has m number of traffic measurement means, and said standby system UPC circuits has n number of traffic measurement means.

19. The UPC circuit fault diagnosis system as claimed in claim 14, wherein one of said main system UPC circuit (W) and said standby system UPC circuit (P) is configured so that when so specified, they function as interchangeable circuits.

20. The UPC circuit fault diagnosis system as claimed in claim 19, wherein said main system UPC circuit (W) performs by k traffic measurements thereof usage parameter control of k kinds of cells, k being smaller than m, and the remaining 1 to m-k number of traffic measurement means are in standby system UPC circuits (P).

21. The UPC circuit fault diagnosis system claimed in claim 14, wherein each of said main system UPC circuit (W) and said standby system UPC circuit (P) is configured so that when specified, a used status or an unused status is given to each traffic measurement means.

22. The UPC circuit fault diagnosis system claimed in claim 14, wherein said main system UPC circuit (W) and said standby system UPC circuit (P) are configured so that an object cell can be changed with respect to each traffic measurement means.

23. The UPC circuit fault diagnosis system claimed in claim 22, wherein means is provided for changing an object cell of said standby system UPC circuit (P) periodically.

24. The UPC circuit fault diagnosis system claimed in claim 14, wherein information having the same conditions in said systems is compared and a place of the fault is isolated by majority processing.

25. The UPC circuit fault diagnosis system claimed in claim 20, wherein changing an object cell of said standby system UPC circuit (P) is performed in accordance with information of a control table having information for selection of a standby system UPC system.

26. The UPC circuit fault diagnosis system claimed in claim 25, wherein information of said control table is configured so that it can be changed.

27. The UPC circuit fault diagnosis system as claimed in claim 26, wherein when there is a detection of a fault in said main system UPC circuit (W) said main system UPC circuit (W) is switched to a standby system UPC circuit (P).

28. A UPC circuit fault diagnosis apparatus for controlling cell traffic on the basis of prescribed information about a traffic of a cell which is one kind of fixed-length packet in an asynchronous transfer mode (ATM) method, the apparatus comprising:

a main system UPC circuit (W) for performing usage parameter control, by using a predetermined value as the basis to perform a judgment of whether or not m kinds of cell have a traffic surplus compared to said predetermined value, and controlling the amount of traffic of said m kinds of cells flowing along a transfer path;

a standby system UPC circuit (P) for performing usage parameter control, by using a predetermined value as the basis to perform a judgment of whether or not n kinds of cells have traffic surplus compared to said predetermined value, and controlling the amount of traffic of said n kinds of cells flowing along the transfer path;

q number of bridge memories ($4_1$–$4_n$) for storing predetermined information for an arriving cell in a time sequence;

a comparison means for comparing contents of said bridge memories ($4_1$–$4_n$) in two or more systems and outputting a result of comparison; and a bridge memory diagnosis means for using said comparison results output from said comparison means to perform fault diagnosis for said bridge memories ($4_1$–$4_n$).

29. The UPC circuit fault diagnosis apparatus as claimed in claim 28, wherein when there is detection of a fault in said main system UPC circuit (W), said main system UPC circuit (W) is switched to said standby system a UPC circuit (P).

30. The UPC circuit fault diagnosis apparatus as claimed in claim 28, wherein said information having the same conditions in said systems is compared and a place of the fault is isolated by majority processing.

* * * * *

UNITED STATES PATENT AND TRADEMARK OFFICE
CERTIFICATE OF CORRECTION

PATENT NO. : 5,465,348
DATED : Nov. 7, 1995
INVENTOR(S) : Shigeo AMEMIYA, et al

It is certified that error appears in the above-identified patent and that said Letters Patent is hereby corrected as shown below:

On the title page ; item [73] should be corrected as follows:

Assignee: Fujitsu Limited, Kanagawa, Japan
                  Nippon Telegraph and Telephone Corporation, Tokyo, Japan
                  Hitachi, Ltd., Tokyo, Japan Signed and Sealed this Twentieth Day of August, 1996

Attest:

BRUCE LEHMAN

*Attesting Officer*      *Commissioner of Patents and Trademarks*